(12) United States Patent
Ghorbani et al.

(10) Patent No.: US 11,615,455 B2
(45) Date of Patent: *Mar. 28, 2023

(54) SYSTEMS AND METHODS FOR USING KEYWORDS EXTRACTED FROM REVIEWS

(71) Applicant: SHOPIFY INC., Ottawa (CA)

(72) Inventors: Siavash Ghorbani, Toronto (CA); Carl Johan Gustavsson, Stockholm (SE)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,727

(22) Filed: Sep. 20, 2021

(65) Prior Publication Data

US 2022/0005102 A1     Jan. 6, 2022

Related U.S. Application Data

(63) Continuation of application No. 16/674,524, filed on Nov. 5, 2019, now Pat. No. 11,188,967.

(51) Int. Cl.
| | |
|---|---|
| *G06Q 30/00* | (2012.01) |
| *G06Q 30/0601* | (2023.01) |
| *G06Q 30/0282* | (2023.01) |
| *G06F 16/9535* | (2019.01) |
| *H04L 67/306* | (2022.01) |
| *G06Q 30/0251* | (2023.01) |

(Continued)

(52) U.S. Cl.
CPC ..... *G06Q 30/0631* (2013.01); *G06F 16/9535* (2019.01); *G06Q 30/0201* (2013.01); *G06Q 30/0269* (2013.01); *G06Q 30/0282* (2013.01); *G06Q 50/01* (2013.01); *H04L 67/306* (2013.01)

(58) Field of Classification Search
CPC .......... G06Q 30/0631; G06Q 30/0201; G06Q 30/0269; G06Q 30/0282; G06Q 50/01; G06F 16/9535; H04L 67/306
See application file for complete search history.

(56) References Cited

U.S. PATENT DOCUMENTS

| | | |
|---|---|---|
| 2015/0186790 A1 | 7/2015 | Ehlen et al. |
| 2018/0182001 A1* | 6/2018 | Ghoshal ............. G06Q 30/0282 |

(Continued)

OTHER PUBLICATIONS

Kaushik Lakshmish et al. "Automatic Audio Sentiment Extraction Using Keyword Spotting", Retrieved from the Internet, URL: https://www.researchgate.net/profile/Abhijeet-Sangwan-2/publication/281492189_Automatic_Audio_Sentiment_Extraction_Using_Keyword_Spotting/links/55eaf05608aeb65162675a09/Automatic-Audio-Sentimen.*

(Continued)

*Primary Examiner* — Kathleen Palavecino
(74) *Attorney, Agent, or Firm* — Ridout & Maybee LLP

(57) ABSTRACT

Methods and systems for generating recommendations are disclosed. In some examples, from a set of positive reviews associated with a merchant offering, at least one attribute is identified and associated with the set of positive reviews, based on reviewer profiles associated with each respective positive review. The attribute is associated with the merchant offering. A match is determined between a customer attribute in a first customer profile and the at least one attribute. A set of recommendations is generated to be presented, via a customer electronic device, to a customer associated with the first customer profile, the set of recommendations including the merchant offering associated with at least one attribute.

21 Claims, 20 Drawing Sheets

(51) Int. Cl.
    *G06Q 30/0201*    (2023.01)
    *G06Q 50/00*      (2012.01)

(56) References Cited

U.S. PATENT DOCUMENTS

| | | |
|---|---|---|
| 2018/0300794 A1 | 10/2018 | Viederman |
| 2019/0180095 A1 | 6/2019 | Ferguson et al. |
| 2019/0318407 A1 | 10/2019 | Giridhari |
| 2019/0333118 A1 | 10/2019 | Crimmins et al. |
| 2020/0065868 A1 | 2/2020 | Garlapati et al. |

OTHER PUBLICATIONS

Kaushik Lakshmish et al. "Automatic Audio Sentiment Extraction Using Keyword Spotting", Retrieved from the Internet, URL: https://www.researchgate.net/profile/Abhijeet-Sangwan-2/publication/281492189_Automatic_Audio_Sentiment_Extraction_Using_Keyword_Spotting/links/55eaf05608aeb65162675a09/Automatic-Audio-Sentiment-Extraction-Using-Keyword-Spotting.pdf (retrieved on Feb. 25, 2021) Sep. 5, 2015.

Extended European Search Report re: Application No. 20205534.9-1213 dated Mar. 5, 2021.

\* cited by examiner

FIG. 2

SYSTEMS AND METHODS FOR USING KEYWORDS EXTRACTED FROM REVIEWS

CROSS-REFERENCE TO RELATED APPLICATIONS

The present application is a continuation of U.S. patent application Ser. No. 16/674,524, filed Nov. 5, 2019, entitled "SYSTEMS AND METHODS FOR USING KEYWORDS EXTRACTED FROM REVIEWS", the entirety of which is incorporated herein by reference.

FIELD

The present disclosure relates to systems and methods for using keywords that have been extracted from reviews, which may be implemented on an e-commerce platform.

BACKGROUND

An e-commerce platform may enable a customer to purchase offerings (e.g., goods and/or services) from a merchant. Frequently, a customer may also use the e-commerce platform to discover (e.g., using a search service and/or a recommendation service provided by the e-commerce platform) merchant offerings that may be of interest.

Conventionally, searching for a merchant offering may involve entering a keyword in a search query, and search results generated are those having product/service descriptions that include the keyword. Such an approach may be dependent on the merchant having used certain specific keywords in the description of the product/service. Also, conventional approaches for generating recommended offerings for a customer may generate recommendations based on a generic categorization of the customer. Thus, the process for a customer to discover offerings of potential interest may have significant drawbacks.

An e-commerce platform may provide a capability for customers who have purchased an offering to provide a review for that offering. It would be desirable to provide a solution that is able to leverage information from customer reviews to enhance the discovery process.

SUMMARY

The present disclosure describes various examples in which keywords that are extracted from customer-generated reviews are used to enhance the discovery process for another customer. In some implementations, the discovery process may be further tailored to a prospective customer based on a match of attributes. For example, when a reviewer with attributes that match the customer's attributes provides a positive review of a merchant offering, it may be expected that the customer would also enjoy that merchant offering.

In some examples, keywords are extracted from reviews and used to supplement search results for a search query (which may or may not be keyword-based).

In some examples, positive reviews from reviewers who have attributes that match a prospective customer are leveraged to generate recommendations for that customer.

In some examples, keywords extracted from reviews are used to supplement a listing of a merchant offering.

In some aspects, the present disclosure describes a system including a processor in communication with a storage. The processor is configured to execute instructions to cause the system to identify, from a set of positive reviews associated with a merchant offering, at least one attribute associated with the set of positive reviews, based on reviewer profiles associated with each respective positive review. The instructions further cause the system to associate the at least one attribute with the merchant offering. The instructions further cause the system to determine a match between a customer attribute in a first customer profile and the at least one attribute. The instructions further cause the system to generate a set of recommendations to be presented, via a customer electronic device, to a customer associated with the first customer profile, the set of recommendations including the merchant offering associated with at least one attribute.

In some aspects, the present disclosure describes a method. The method includes identifying, from a set of positive reviews associated with a merchant offering, at least one attribute associated with the set of positive reviews, based on reviewer profiles associated with each respective positive review. The method also includes associating the at least one attribute with the merchant offering. The method also includes determining a match between a customer attribute in a first customer profile and the at least one attribute. The method also includes generating a set of recommendations to be presented, via a customer electronic device, to a customer associated with the first customer profile, the set of recommendations including the merchant offering associated with at least one attribute.

In some aspects, the present disclosure includes a computer readable medium having instructions tangibly stored thereon. The instructions, when executed, cause a system to identify, from a set of positive reviews associated with a merchant offering, at least one attribute associated with the set of positive reviews, based on reviewer profiles associated with each respective positive review. The instructions also cause the system to associate the at least one attribute with the merchant offering. The instructions also cause the system to determine a match between a customer attribute in a first customer profile and the at least one attribute. The instructions also cause the system to generate a set of recommendations to be presented, via a customer electronic device, to a customer associated with the first customer profile, the set of recommendations including the merchant offering associated with at least one attribute.

In any of the above, the instructions may further cause the system to (or the method may include) identify a set of positive reviews from the one or more stored reviews.

In any of the above, each stored review may include a quantitative rating, and wherein the set of positive reviews is identified based on the quantitative rating.

In any of the above, the instructions may further cause the system to (or the method may include) identify the set of positive reviews by extracting one or more keywords associated with each stored review. The set of positive reviews may be identified, using the one or more keywords extracted from each respective stored review.

In any of the above, the plurality of stored reviews may include a non-textual review having an audio component. The instructions may further cause the system to (or the method may include) perform speech-to-text conversion to convert the audio component to a textual component, and perform text analysis on the textual component to extract the one or more keywords.

In any of the above, the instructions may further cause the system to (or the method may include): determine a correlation between the at least one attribute and the set of positive reviews; and include an indicator of correlation in the association between the at least one attribute and the merchant offering, the indicator of correlation representing a strength of the correlation between the at least one attribute with the set of positive reviews for the merchant offering.

In any of the above, the correlation may be determined based on a measured occurrence of the at least one attribute in the set of positive reviews compared to a measured occurrence of the at least one attribute in a set of non-positive reviews for the merchant offering.

In any of the above, the set of recommendations may be ordered based on the indicator of correlation for each merchant offering in the set of recommendations.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

The present disclosure will be described in the context of an e-commerce platform, discussed below. However, it should be understood that this discussed is only for the purpose of illustration and is not intended to be limiting. Further, it should be understood that the present disclosure may be implemented in other contexts, and is not necessarily limited to implementation in an e-commerce platform.

Figure 1:
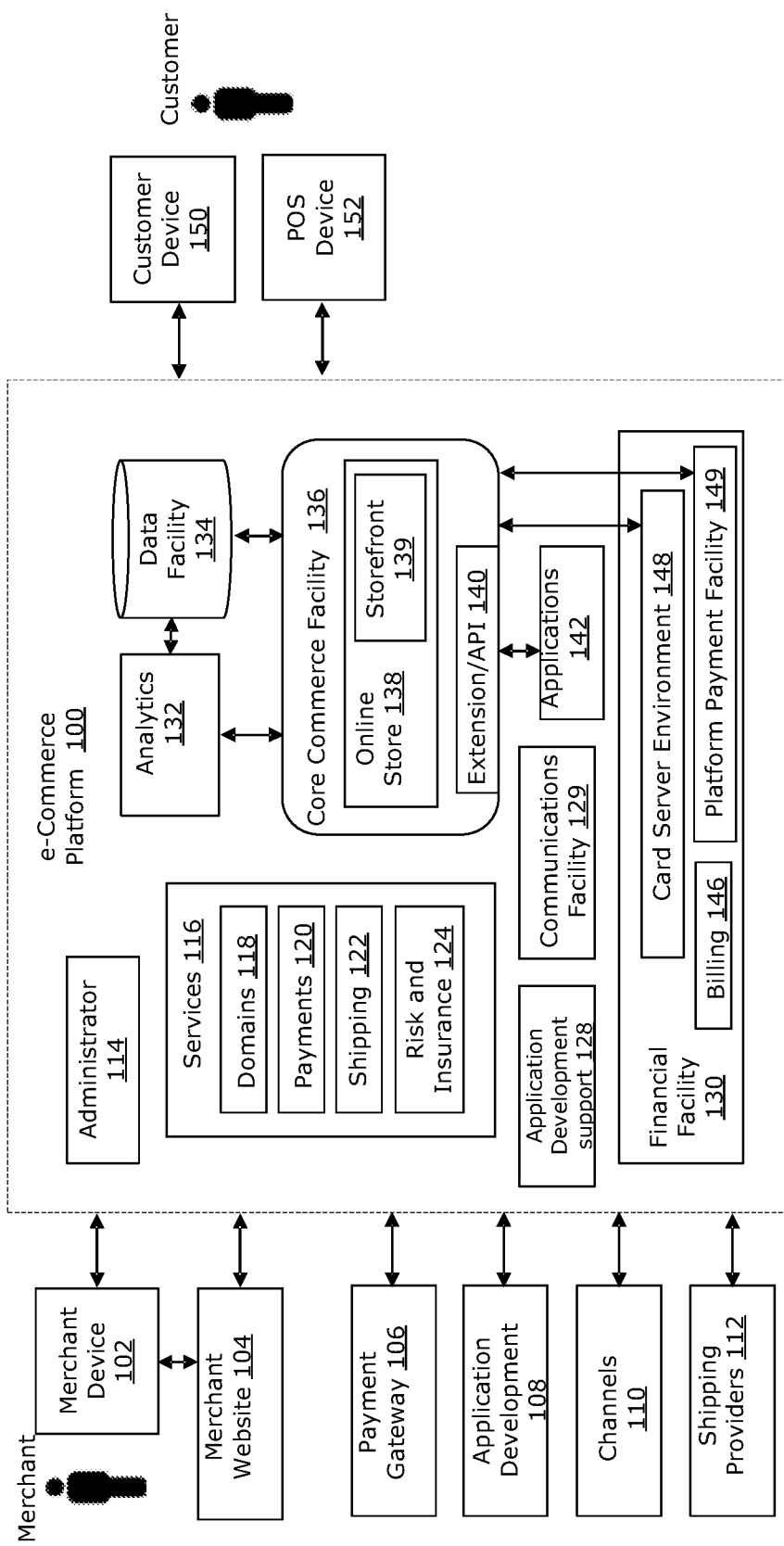
FIG. 1 is a block diagram of an example e-commerce platform, in which examples described herein may be implemented.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products or offerings. All references to products or offerings throughout this disclosure should also be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a perspective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an on-line business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
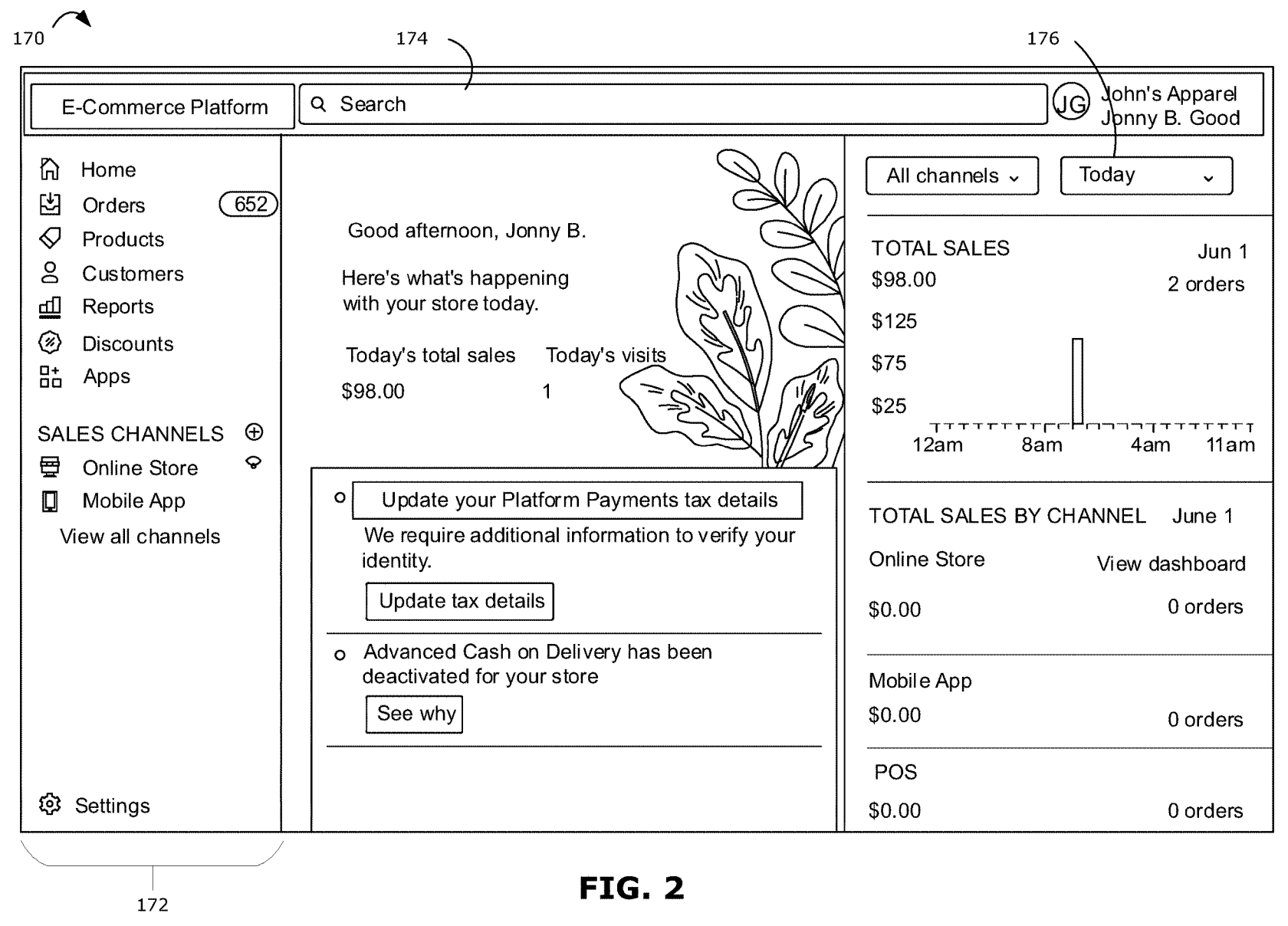

FIG. 2 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 2. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 1. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, backpressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 3). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 3:
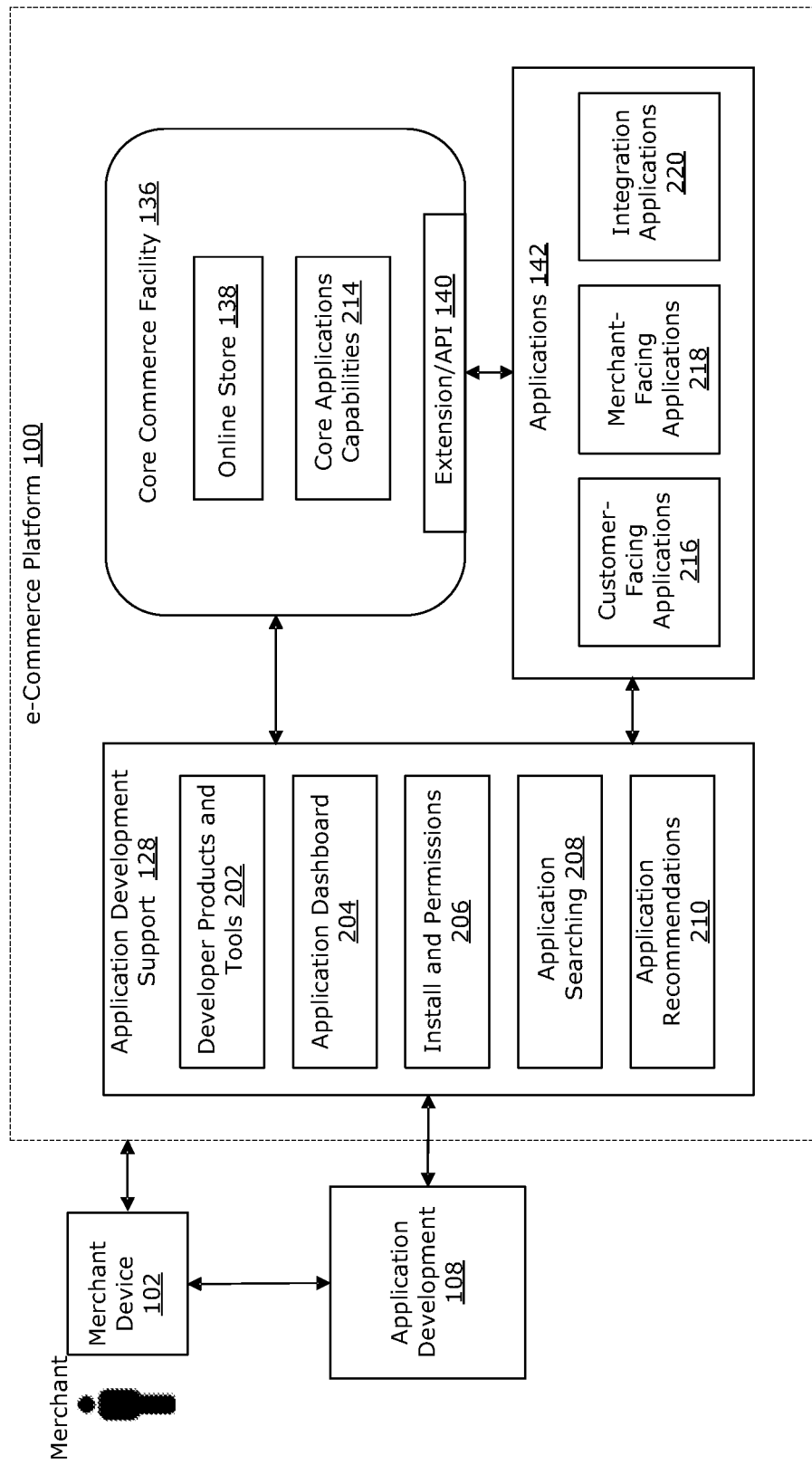
FIG. 3 is another block diagram of the e-commerce platform of FIG. 1, showing some details related to application development.

Reference is made to FIG. 3, which is another depiction of the e-commerce platform 100. FIG. 3 omits some details that have been described with reference to FIG. 1, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 4:
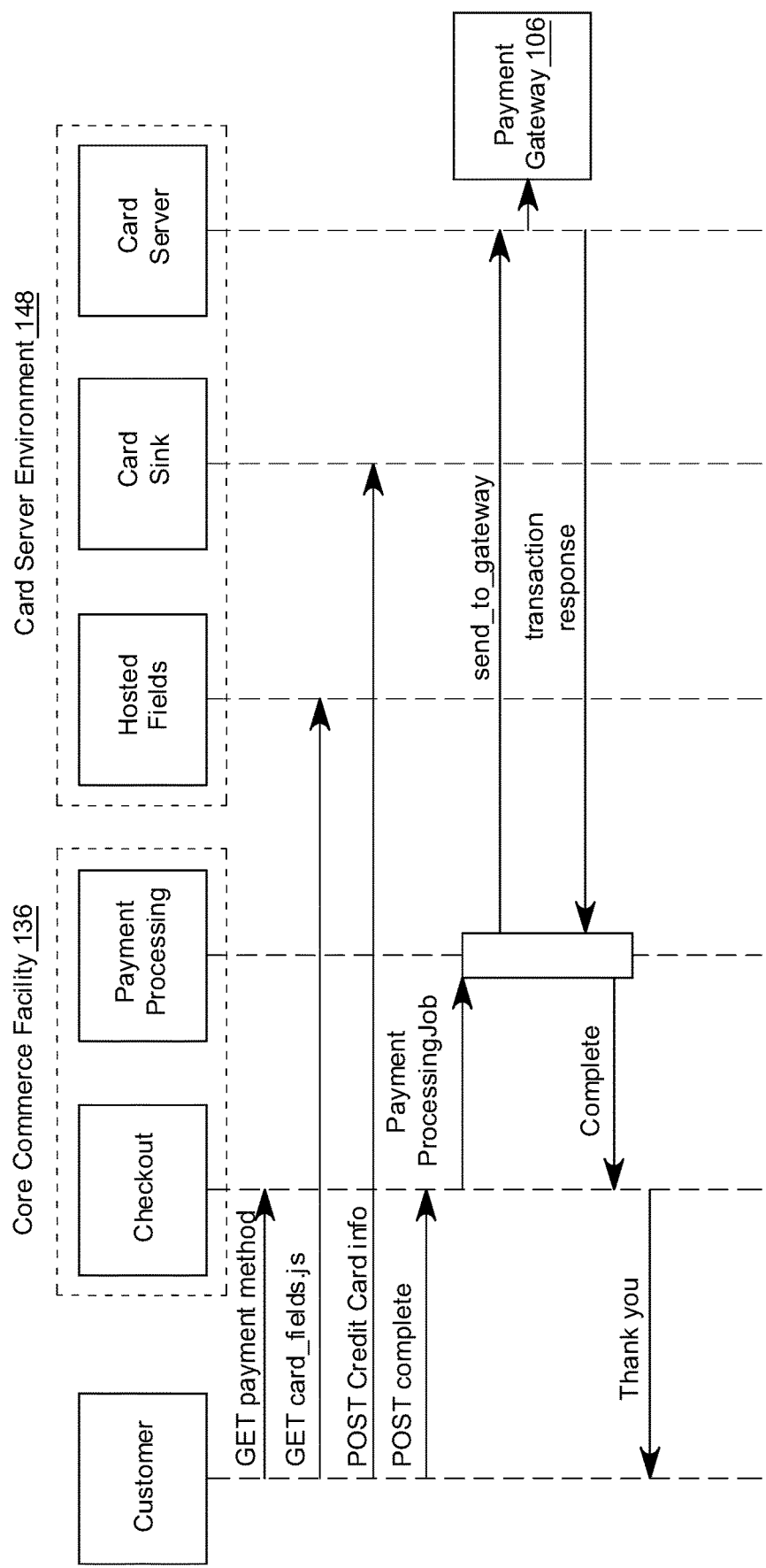
FIG. 4 shows example data flows that may take place when a purchase is made using the e-commerce platform of FIG. 1.

FIG. 4 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 103 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

After the fulfillment process has been completed and the customer has received the purchased offering, the customer may be invited (e.g., via a notification pushed by the e-commerce platform 100) to provide a review for the purchased offering. The option to provide a review may only be available to a customer after the purchased offering has been verified as received. In the case where the offering is a service, the option to provide a review may only be available to a customer after the service has been completed. In this way, only customers who have made a verified purchase of an offering may be able to create reviews for the offering.

The e-commerce platform 100 may provide a user interface, to be presented via the customer device 150, to enable the customer to provide a review. The user interface may provide various options for creating the review including, for example, an option for a simple quantitative review (e.g., a star rating or a number from 1-5), an option for a text review, an option for an audio review and/or an option for a video review. A customer who provides a review for a purchased offering may be referred to herein as a "reviewer". It should be understood that any customer of a given offering may be also a reviewer of that offering, and any reviewer for a given offering may also be a customer of a different offering. Further, a reviewer may not necessarily be an individual (e.g., a company that purchases an offering may be a reviewer), however for simplicity the present disclosure will refer to reviewers as individuals.

Figure 5:
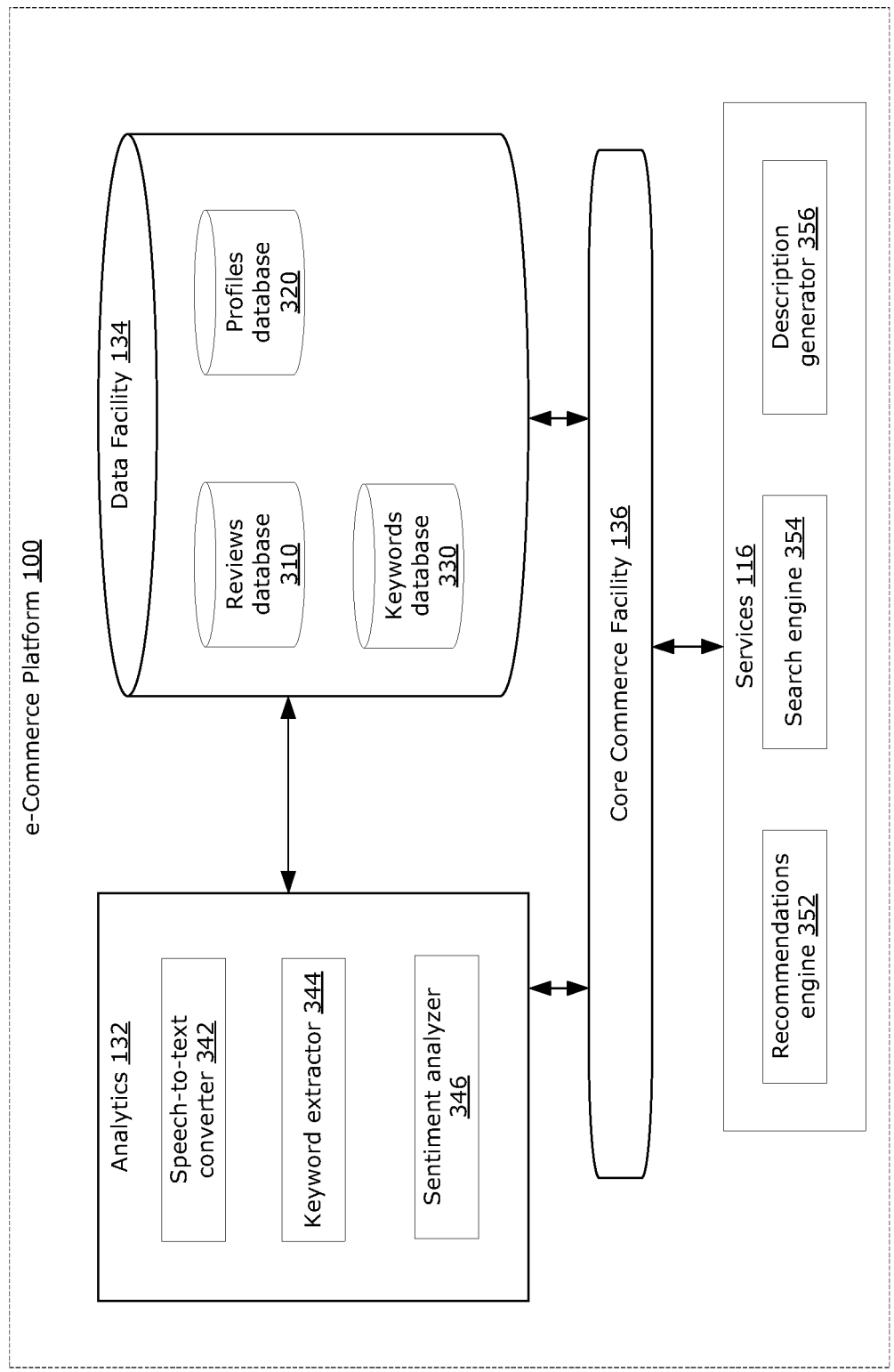
FIG. 5 is another block diagram of the e-commerce platform of FIG. 1, showing some details related to keyword extraction and review analysis.

Reference will now be made to FIG. 5. FIG. 5 is another depiction of the e-commerce platform 100 that omits some details that have been described with reference to FIG. 1, and shows further details discussed below. In particular, FIG. 5 illustrates some details of the data facility 134, the analytics facility 132 and the services 116 that are relevant to reviews and keyword extraction.

In this example, the data facility 134 includes a reviews database 310 containing review data, a profiles database 320 containing customer profile data, and a keywords database 330 containing keyword data. Further details of the databases 310, 320, 330 will be discussed further below.

The analytics facility 132 in this example includes a speech-to-text converter 342, a keyword extractor 344 and a sentiment analyzer 346. Each of the speech-to-text converter 342, keyword extractor 344 and sentiment analyzer 346 may be implemented as separate sub-modules of the analytics facility 132. In some examples, the functions of one or more of the speech-to-text converter 342, keyword extractor 344 and sentiment analyzer 346 may be provided using a single sub-module (instead of three separate sub-modules) or implemented as general functions of the analytics facility 132. As will be discussed further below, one or more of the speech-to-text converter 342, keyword extractor 344 and sentiment analyzer 346 may be implemented using a machine-learning system.

The e-commerce platform 100 in this example provides services 116 including a recommendations engine 352, a search engine 354 and a description generator 356. The recommendations engine 352 serves to provide a set of recommended merchant offerings to a prospective customer. The search engine 354 serves to provide a set of search results in response to a search query from a customer. The description generator 356 serves to generate and/or augment a description included in a listing of a merchant offering. Each of the recommendations engine 352, search engine 354 and description generator 356 may use information stored in the data facility 134 and/or information generated by the analytics facility 132 to perform the relevant operations, as discussed further below.

It should be noted that the data facility 134, analytics facility 132, core commerce facility 136 and services 116 may be implemented in separate hardware components, but may be taken together as part of the single-entity e-commerce platform 100.

Figure 7:
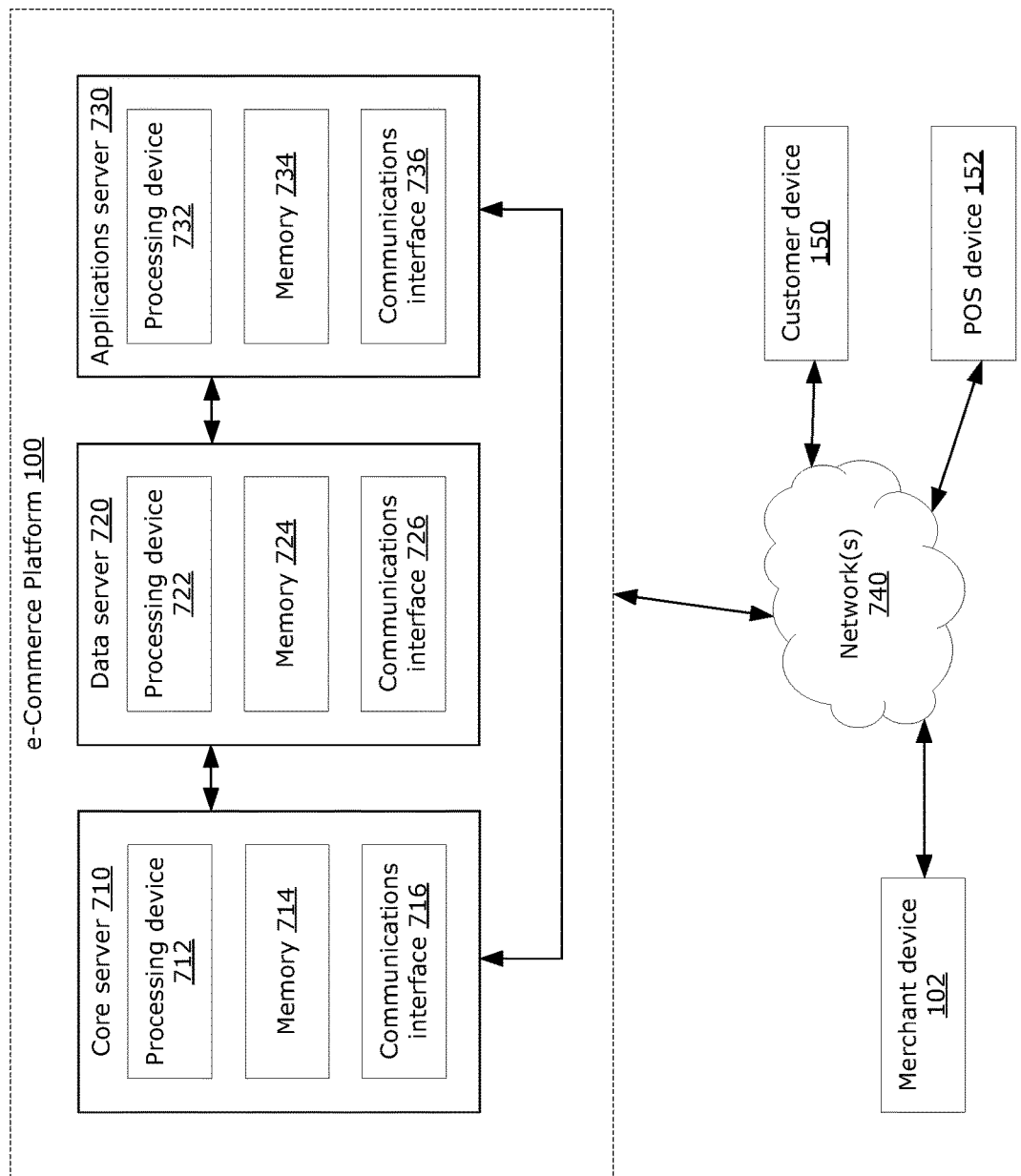
FIG. 7 is a block diagram illustrating an example implementation of the e-commerce platform of FIG. 1.

FIG. 7 is a block diagram of an example hardware configuration of the e-commerce platform 100. In this example, the e-commerce platform 100 includes a core server 710, a data server 720 and an applications server 730, which are each in communication with each other (e.g., via wired connections and/or via wireless intranet connections). Each of the servers 710, 720, 730 include a respective processing device 712, 722, 732 (each of which may be, for example, a microprocessor, graphical processing unit, digital signal processor or other computational element), a respective memory 714, 724, 734 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 716, 726, 736 (each of which may include transmitter, receiver and/or transceiver for wired and/or wireless communications). The core server 710 may store instructions and perform operations relevant to core capabilities of the e-commerce platform, such as providing the administrator 114, analytics 132, core commerce facility 136, services 116 and/or financial facility 130, among others. The data server 720 may be used to implement the data facility 134, including the reviews database 310, the profiles database 320 and the keywords database 330, among others. The applications server 730 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 740 (e.g., wired and/or wireless networks, including a virtual private network (VPN), the Internet, and the like).

Although FIG. 7 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 714, 724, 734 may be replaced with external storage or cloud-based storage, among other possible modifications.

Figure 6:
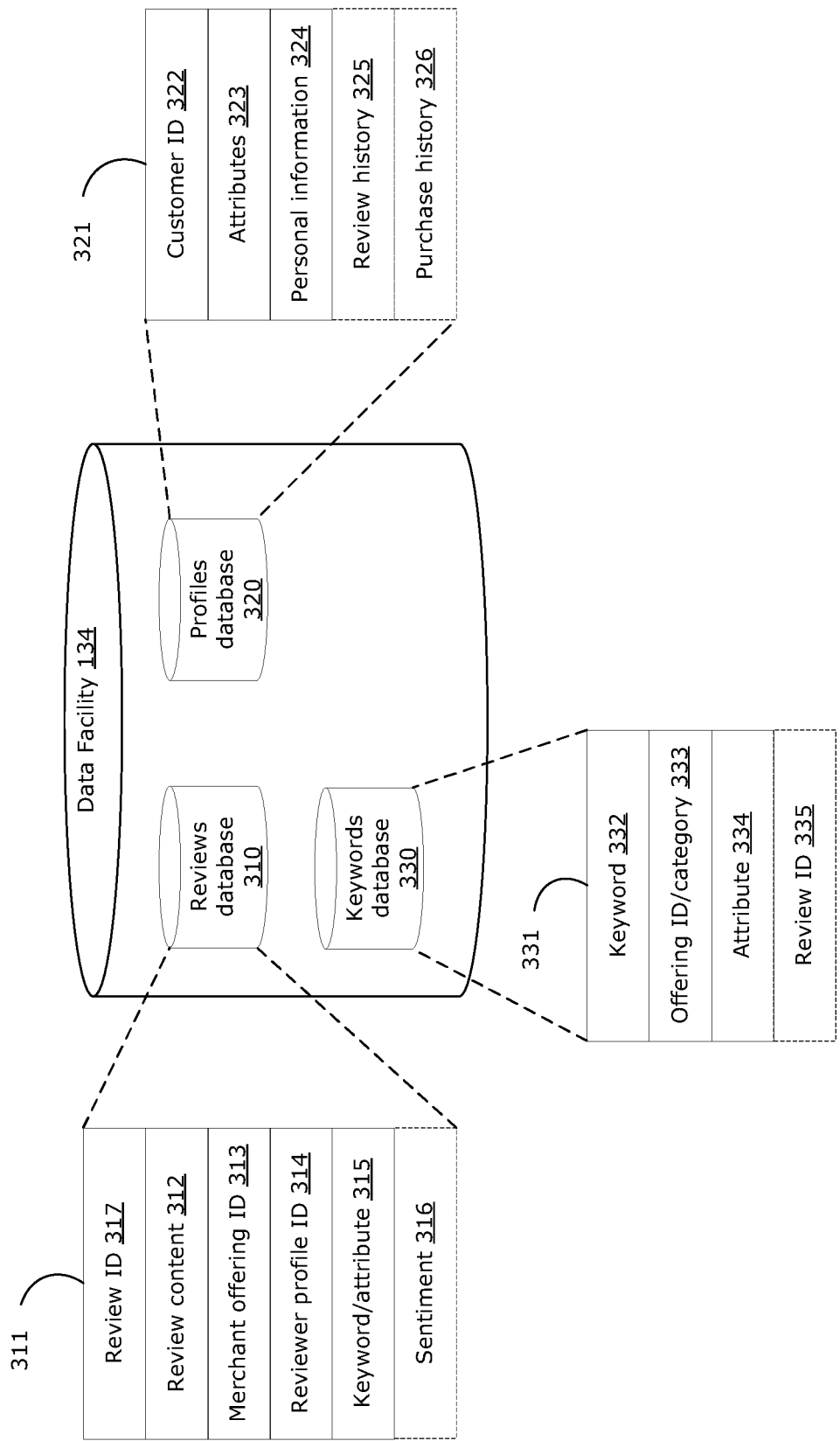
FIG. 6 is a block diagram illustrating example data structures that may be stored in the e-commerce platform of FIG. 1.

Reference is made back to FIGS. 5 and 6. As mentioned above, after a purchase of a merchant offering by a customer has been verified, the customer may be provided one or more options for creating a review for that offering. The customer who creates a review for a merchant offering is also referred to as a reviewer. The reviewer may create and submit the review using a user interface provided by the e-commerce platform 100. The submitted review is received by the e-commerce platform.

After the review is submitted, optionally the review may be assessed by the e-commerce platform 100 for approval. For example, the e-commerce platform 100 may include a moderator facility (not shown) which may assess the review for appropriate language, content, relevance, and the like. The moderator facility may be implemented using any suitable approach, including machine-learning algorithms, rules-based algorithm, human-assisted assessment or combinations thereof. The submitted review may also be assessed for quality (e.g., video quality, audio quality, encoding rate, bitrate, aspect ratios, etc. for video reviews; grammar, language used, formatting, etc. for text reviews). Such quality assessment may affect whether the submitted review is approved to be stored in the reviews database 310, or whether the submitted review would be prioritized to be presented to a customer (e.g., higher quality reviews may be ranked higher when multiple reviews are presented to a customer). Such quality assessment may also provide contextual information, such as the equipment used to create a video review. The review (after approval if applicable) may be stored in the reviews database 310. The information from the assessment may be stored with the review as metadata.

Reviews may be retrieved from the reviews database 310 using indices or identifiers to reference each review. A fast retrieval technique may be used, for example by prefetching selected reviews from the reviews database 310 into a temporary storage (e.g., a cache memory) from which the selected reviews can be presented when desired. Various techniques may be used to enable retrieval of reviews by reference identifiers and to enable reviews to be efficiently presented to a customer and/or shared by the customer.

As will be discussed further below, a review may be associated with the attribute(s) of the reviewer. In the present disclosure, the term "attribute" should be understood to refer to characteristics of the customer (or reviewer), such as age, height, geographical location, marital status, gender, skin type, body shape, income, and the like. Such attributes may be explicitly identified by the customer (e.g., inputted in a profile) and/or may be implicitly determined based on the customer's behavior (e.g., purchase history, viewing history, etc.). In particular, it should be understood that an attribute may not be simply the customer's purchase history or viewing history, but rather the characteristics of the customer him/herself (which may be inferred from the purchase history or viewing history). In some examples, a customer's profile may include attributes (e.g., home address) without including any historical information. Conversely, in some examples a customer's profile may include historical information (e.g., a past purchase) without including any attributes.

FIG. 6 illustrates an example data structure for a stored review 311 in the reviews database 310. The review 311 in this example includes a review identifier (ID) 317 (e.g., a code or other reference identifying the unique review 311 in the reviews database 310); review content 312 (e.g., the text, audio, video, etc. created by the reviewer describing the reviewed offering); merchant offering ID 313 (e.g., a code or other reference identifying the offering that was reviewed); reviewer profile ID 314 (e.g., a code or other reference identifying the customer who created the review 311); keyword/attribute 315 (e.g., one or more keywords and/or attributes relevant to the review 311); and optionally sentiment 316 (e.g., an indication of whether the review 311 is positive, negative or neutral).

The review content 312 may be any suitable format, appropriate to the mode of input that was used to create the review 311. For example, the review content 312 may be a text file, an audio file, a video file, a quantitative indicator, combinations thereof, and the like. The merchant offering ID 313 and the reviewer profile ID 314 may be automatically associated and stored with the review 311 when the review 311 is submitted.

When the review 311 is initially submitted to the e-commerce platform 100, there may not be any keyword/attribute 315 or any sentiment 316 associated with the review 311. In other examples, the reviewer may have an option of explicitly identifying one or more keywords/attributes 315 or sentiments 316 for the review 311. Regardless of whether any keywords/attributes 315 or sentiments 316 have been explicitly included by the reviewer, the e-commerce platform 100 may further analyze the review 311 to enrich the review data, using the analytics facility 132. If the review content 312 is not already in text format, the speech-to-text converter 342 may be used to convert the review content 312 into a format (e.g., text format) that may be readily analyzed by the keyword extractor 344. In some examples, the keyword extractor 344 may accept non-text content for analysis (e.g., the keyword extractor 344 may perform analysis and keyword extraction on an audio or video component directly) and the speech-to-text converter 342 need not be used. Speech-to-text conversion may be performed using any suitable techniques, such as algorithmic-based and/or machine-learning based techniques.

The keyword extractor 344 may then analyze the review content 312 (after conversion to text if applicable). The keyword extractor 344 may use various suitable techniques for identifying one or more keywords from the review content 312. For example, the keyword extractor 344 may implement natural language processing (NLP) techniques, rules-based analysis, statistical analysis, machine-learning based techniques (supervised or unsupervised), or combinations thereof, among other possibilities. In some examples, the keyword extractor 344 may take into account the type of merchant offering in order to perform more efficient and/or more accurate keyword extraction. For example, based on the merchant offering ID 313 associated with the review 311, the keyword extractor 344 may identify a category or set of keywords that are more likely to be relevant and to ignore terms that are less likely to be relevant (e.g., terms "slim fit" and "stretchy" may be relevant keywords for a merchant offering in the clothing category, but not relevant to a merchant offering in the edibles category).

One or more attributes 315 may also be associated with the review 311, based on corresponding attribute(s) found in the profile of the identified reviewer (e.g., as identified by the associated reviewer profile ID 314).

Other data (e.g., quality assessment data) may be included in the review 311. Such data may be considered metadata for the review 311, to provide information about the review content 312. The metadata may provide information that may be used (e.g., by the analytic facility 132 and/or the services 116) to analyze, search for and/or present a review from the reviews database 310. Reviews 311 stored in the reviews database 310 may be retrieved by referencing the relevant review ID 317, for example.

FIG. 6 illustrates an example data structure for a stored profile 321 in the profiles database 320. In this example, the profile 321 includes a customer ID 322 (e.g., a code or other reference to uniquely identify the customer within the e-commerce platform 100); attributes 323 (e.g., characteristics of the customer, such as geographical location, size, skin type, gender, height, weight, and the like); personal information 324 (e.g., sensitive information such as home address, full legal name, income, and the like); optionally review history 325 (e.g., list of review IDs identifying reviews created by the customer, if any); and optionally purchase history 326 (e.g., identification of offerings purchased by the customer, if any). Other information may be stored in the profile 321, such as viewing history, search history, etc.

Every customer who makes a purchase through the e-commerce platform 100 may have an associated profile 321 stored in the profiles database 320. In some examples, a profile 321 may be created when a customer initiates a purchase for the first time on the e-commerce platform 100, or when a customer logs into the e-commerce platform 100 for the first time. The profile 321 may include information explicitly provided by the customer (e.g., personal information 324 such as full legal name and home address) as well as information that can be deduced or estimated (e.g., using the analytics facility 132) from the personal information 324, the review history 325 and/or the purchase history 326. For example, from the explicitly provided home address (in the personal information 324), the general geographical region of the customer (e.g., rural or urban, metropolitan region, etc.) may be deduced or estimated. Some implicit information may be deduced by recognizing (e.g., using statistical analysis and/or machine-learning based techniques implemented by the analytics facility 132 and/or using human analysis) patterns in the customer's purchase history 326. For example, from the review history 325 and/or the purchase history 326, the customer's purchase preferences (e.g., preferred color, clothing size, shoe size, etc.) may be deduced or estimated. Various other such information, such as marital status, family size, number of children, etc. may also be deduced or estimated. By tracking the customer's review history 325 and purchase history 326 over time, implicit information may be deduced with greater detail. Various different techniques may be used to extract such implicit information, as known in the art, the details of which are not discussed herein.

The information in the profile 321 may be periodically or intermittently updated, depending on customer activity on the e-commerce platform 100. For example, the review history 325 and/or purchase history 326 may be updated as the customer creates reviews and/or makes purchases. The analytics facility 132 may regularly or intermittently analyze the review history 325 and/or purchase history 326 in order to update the attributes 323 for that customer.

As previously mentioned, every reviewer may also be a customer. Accordingly, the reviewer profile ID 314 associated with a review 311 can be referenced with the customer ID 322, in order to identify the profile 321 of the reviewer. Having identified the profile 321 of the reviewer who created the review 311, one or more attributes 323 from the reviewer's profile 321 may be identified and associated with the review 311. In some examples, each attribute 323 in the profile 321 may be labeled or otherwise identified as being relevant to one or more specific categories of offerings. For example, a height attribute may be relevant to the clothing category, but may be irrelevant to the edibles category. The attribute(s) 323 that is(are) associated with the review 311 may be limited to those attribute(s) 323 that is(are) relevant to the category of offering that is the target of the review 311.

Each keyword that is extracted from a review 311 may be stored in the keywords database 330. FIG. 6 illustrates an example data structure for stored keyword data 331 in the keywords database 330. In this example, the keyword data 331 includes the extracted keyword 332; an offering ID/category 333 identifying one or more merchant offerings and/or one or more categories of offerings associated with the keyword 332; one or more attributes 334 associated with the keyword 332; and optionally one or more review IDs 335 identifying the review(s) from which the keyword 332 was extracted.

For a keyword 332 that was extracted from a review 311, the category 333 for the keyword 332 may be identified based on the category of merchant offering that is the target of the review 311. Similarly, the attribute 334 for the keyword 332 may be identified based on the attribute 315 of the review 311.

Although the present disclosure describes a keyword 332 being extracted from a single review 311, for simplicity, in some examples, a keyword 332 may be extracted based on a plurality of reviews 311 (e.g., the keyword extractor 344 may operate on a batch of reviews 311). For example, the keyword extractor 344 may analyze a plurality of reviews 311 for the same merchant offering (e.g., by querying the reviews database 310 for all reviews 311 having a given merchant offering ID 313). The keyword extractor 344 may then use statistical analysis, machine-learning algorithms or other such techniques to extract the keyword(s) commonly used to describe the merchant offering, among those reviews 311. The keyword extractor 344 may only extract keywords that are found in a majority of reviews 311, and ignore keywords that are found only in a small number of reviews 311 (e.g., fewer than 5% of the batch). Other such statistical techniques may be used to ensure that the extracted keywords are accurately reflective of the general community of reviewers. In such examples where keyword extraction is performed on a plurality of reviews 311, the keyword data 331 may not include the review ID 335. Alternatively, the keyword data 331 may include the review IDs 335 of all the reviews 311 that were analyzed, or may include the review ID 335 of a selected representative review 311 for the merchant offering.

Although the present disclosure describes keywords as being extracted from reviews, it should be understood that the keyword database 330 may also contain keyword data 331 for keywords that are not extracted from reviews. For example, a keyword 332 may be identified from an external keyword repository (e.g., a third party may generate and identify keywords relevant to a particular category of offerings), or a keyword 332 may be explicitly identified by a merchant, among other possibilities. Regardless of how a keyword 332 is introduced to the keyword database 330, a process similar to that described above may be used to enrich the keyword data 331 with category 33, attribute 334 and optionally review ID 335 information.

The sentiment analyzer 346 may be used to analyze a review 311 and determine a sentiment 316 (e.g., positive, negative or optionally neural) to be associated with the review 311. In some examples, the sentiment analyzer 346 may analyze the review 311 based on the keyword(s) 315 that have been extracted (by the keyword extractor 344) from the review 311. The sentiment analyzer 346 may categorize the keyword(s) 315 as being positive, negative or optionally neutral (e.g., using a lookup table or by reference to a repository of keywords associated with different sentiments). The categorization of the review 311 as being positive, negative or optionally neutral may be based, for example, on the number of positive or negative (or optionally neutral) keywords extracted from the review 311.

The sentiment analyzer 346 may additionally or alternatively use natural language processing or other language parsing techniques (e.g., including machine-learning based techniques) to analyze the overall sentiment of the review 311 without relying only on keyword(s) 315.

In some examples, the sentiment analyzer 346 may additionally or alternatively determine the sentiment 316 of the review 311 without any reliance on the keyword(s) 315. For example, the review content 312 may include a quantitative indicator (e.g., a star rating or a score out of five). The sentiment analyzer 346 may identify the review 311 as positive or negative (or optionally neutral) by applying one or more thresholds to the quantitative indicator (e.g., above 4 stars is a positive review, below 2 stars is a negative review, and between 2 and 4 stars is a neutral review).

It should be noted that the sentiment analyzer 346 may also use the quantitative indicator to identify and categorize keywords as being positive, negative or optionally neutral (e.g., keywords frequently found in 5 star reviews may be determined to be positive keywords in general). In some examples, the sentiment analyzer 346 may use machine-learning based techniques to categorize keywords in such a manner. Such learned categorization of keywords may be used by the sentiment analyzer 346 to analyze other reviews 311 that do not include a quantitative indicator, for example.

In some examples, the sentiment analyzer 346 may be assisted by human sorting of reviews into positive or negative (or neutral). For example, such manual sorting may be used to help train a machine-learning based system to automatically identify a review as positive or negative (or neutral) in sentiment.

To assist in comprehension, an example of how a keyword is extracted and enriched with attribute information is now discussed with reference to FIGS. 8A-8C.

Figure 8A:
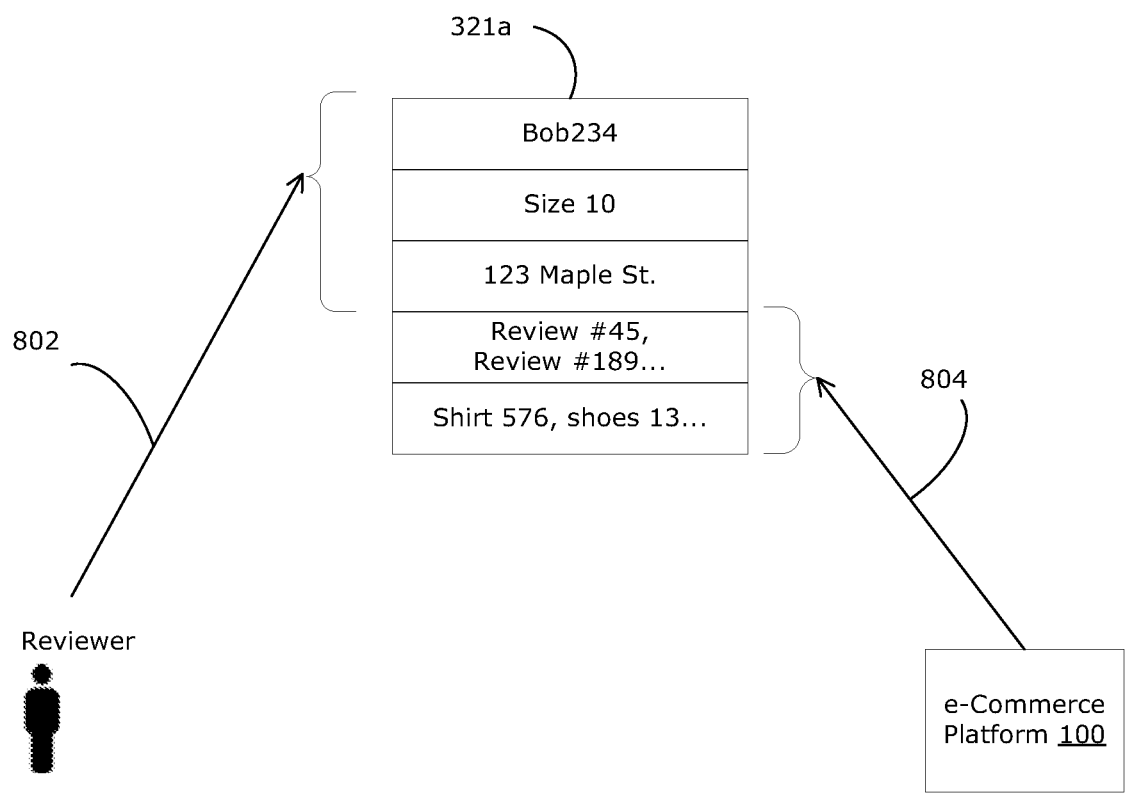
FIGS. 8A-8C are schematic diagrams illustrating an example of how information may be associated between profile data, review data and keyword data.
Figure 8B:
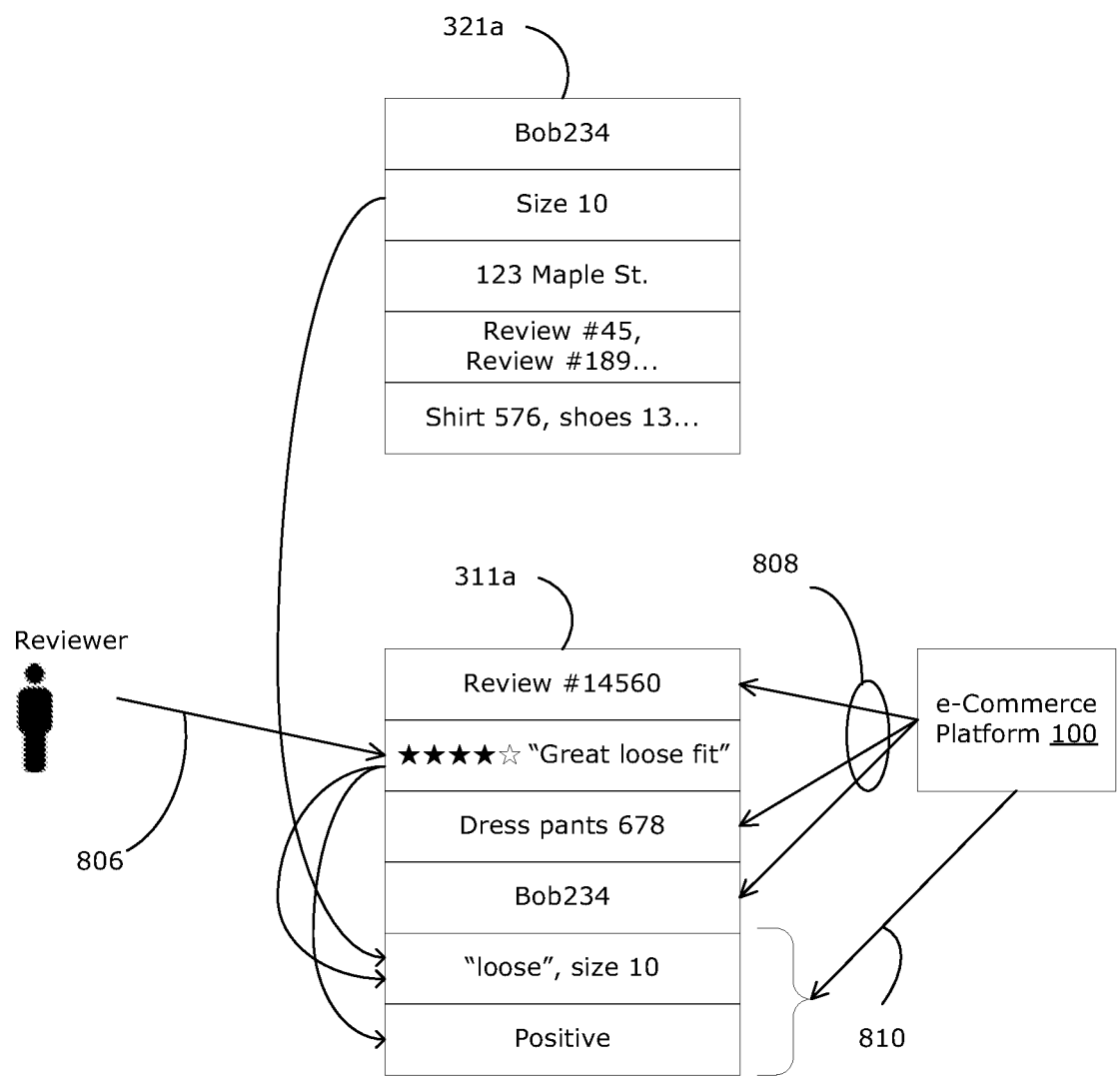
Figure 8C:
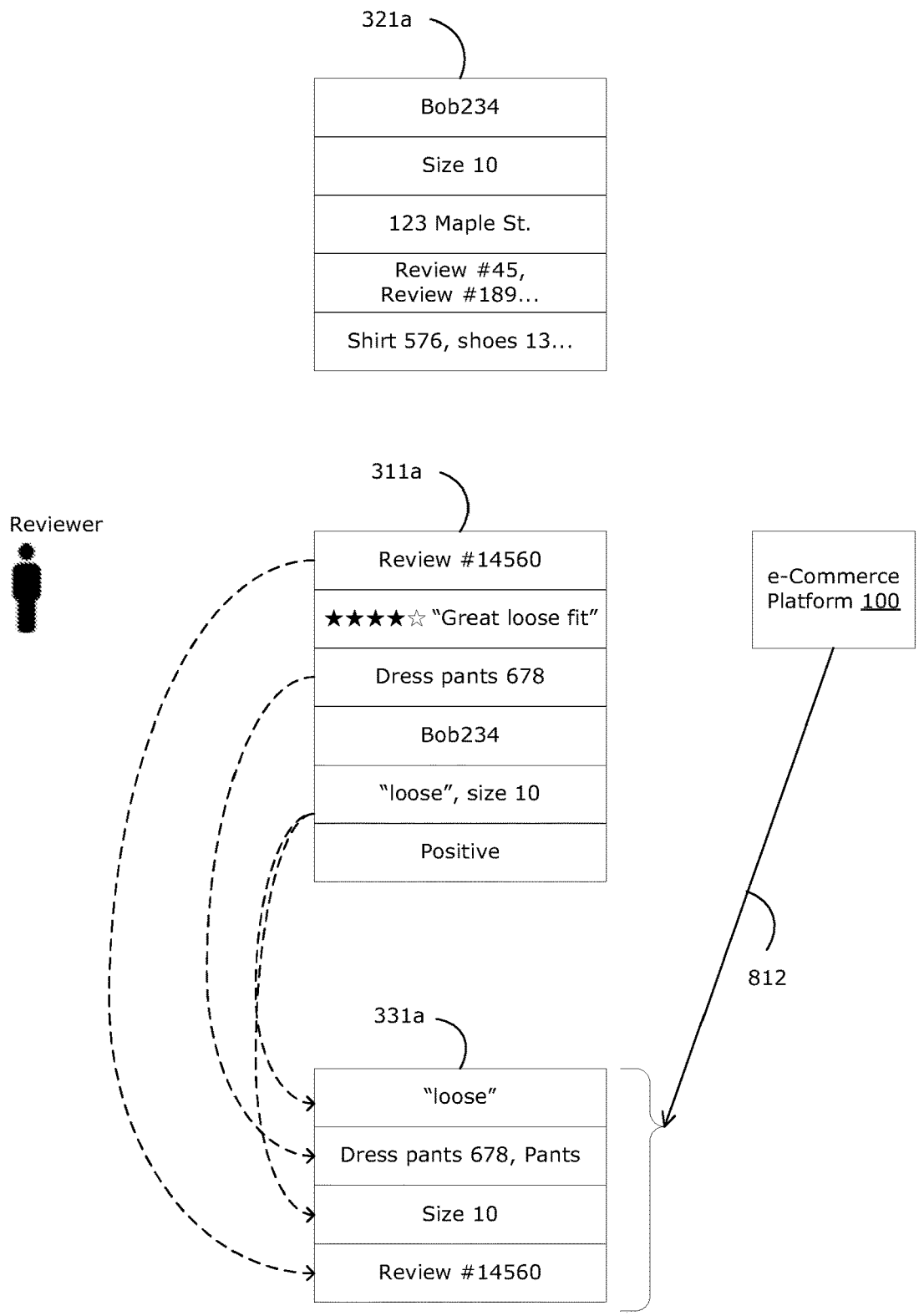

FIGS. 8A-8C illustrates an example reviewer (who is also a customer). In FIG. 8A, the reviewer provides input 802 to create the profile 321a. For example, the reviewer provides input 802 (e.g., via a user interface provided by the e-commerce platform 100, and using the reviewer's electronic device 150) when the reviewer first registers as a customer on the e-commerce platform 100. The information provided by the input 802 includes, for example, the customer ID "Bob234", the attribute "size 10" and the home address "123 Maple St." As the reviewer makes purchases and/or reviews using the e-commerce platform 100, the e-commerce platform 100 may (with or without the reviewer's knowledge) automatically generate additional information 804 to augment the profile 321a, such as the review history (e.g., indicated by review IDs such as "Review #45" and "Review #189") and the purchase history (e.g., indicated by IDs of the purchased offerings such as "Shirt 576" and "shoes 13").

At some time after the reviewer has made a verified purchase, the reviewer is provided an option to create a review for the purchased offering. In FIG. 8B, the reviewer provides input 806 (e.g., via a user interface provided by the e-commerce platform 100, and using the reviewer's electronic device 150) to create review content for the purchased offering (e.g., "Great loose fit" and quantitative indicator four stars out of five). This results in creation of the review 311a. The reviewer may only need to provide input 806 for the review content. After the review content has been submitted by the reviewer, the e-commerce platform 100 may automatically generate additional information 808 to identify the review 311a, such as the review ID "Review #14560". The information 808 generated by the e-commerce platform 100 may also include identification of the offering being reviewed (e.g., "Dress pants 678") and the reviewer ID ("Bob234"), in order to appropriately associate the review 311a with the reviewer and the reviewed offering.

The e-commerce platform 100 may also extract information from the profile 321a and the review 311a to further generate information 810 to add to the review 311a. The relationship between the source data and the extracted information is illustrated in FIG. 8B by solid curved arrows. For example, the e-commerce platform 100 may use the analytics facility 132, as described above, to identify "loose" as a keyword in the review content, "size 10" as a reviewer attribute that is associated with this review 311a, and a positive sentiment for the review 311a based on the quantitative indicator in the review content.

In FIG. 8C, the e-commerce platform 100 may then generate 812 keyword data 331a to store information about the keyword extracted from the review 311a. In FIG. 8C, the relationship between the source data and the information extracted into the keyword data 331a is illustrated by dashed curved arrows. For example, the keyword data 311a is populated with the keyword "loose", the attribute "size 10", the offering ID "Dress pants 678" and category "Pants" and the review ID "Review #14560".

In this way, on the basis of relatively little input from the reviewer, the e-commerce platform is able to generate a rich repository of information.

The data structures illustrated and described with respect to FIGS. 5, 6 and 8A-8C are provided for illustration only. It should be understood that review data, keyword data and profile data (among other possible types of data) may be stored by the e-commerce platform 100 in various suitable formats, including tables, trees, matrices, etc. Further, there may be greater or fewer numbers of data fields for each data structure. Generally, the present disclosure is not limited to any particular data format, and may be adaptable to future developments in data management.

In some aspects of the present disclosure, the information extracted from reviews may be used to enhance a customer's discovery process, for example through enhancement of search results.

Figure 9:
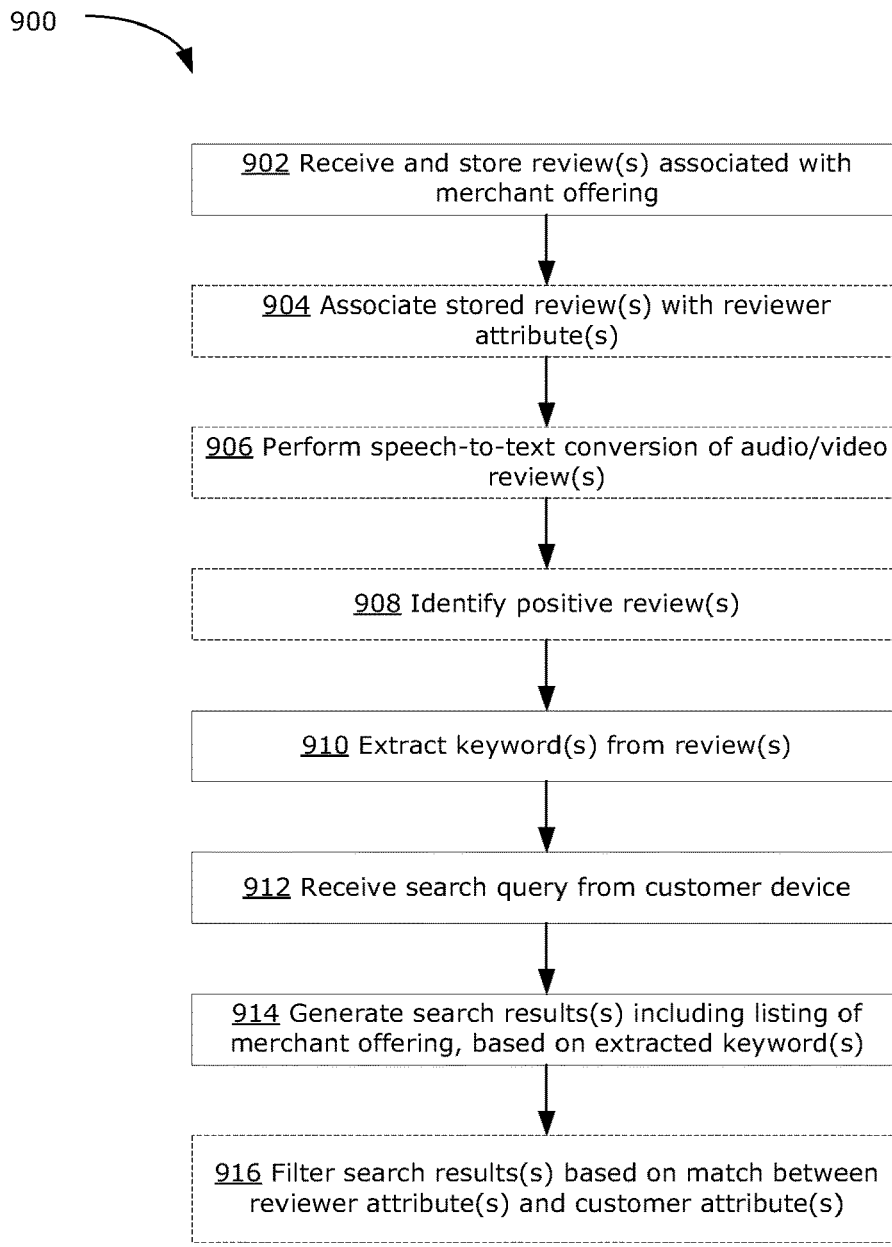
FIG. 9 is a flowchart illustrating an example method for using information extracted from reviews to enhance search results.

FIG. 9 is a flowchart illustrating an example method 900 for using information extracted from reviews to enhance search results. The method 900 may be implemented by the e-commerce platform 100 (e.g., using the analytics facility 132 and/or services 116 at the core server 710). The method 900 may be implemented by a processing device executing instructions. For simplicity, the method 900 will be generally described in the context of a single review for the single merchant offering. However, it should be understood that the method 900 may be carried out in the context of a batch of reviews for various merchant offerings. For example, a machine-learning based approach may enable reviews to be analyzed in batches, to extract and categorize keywords by batches. Accordingly, discussions presented in the context of a single review should also be understood to be applicable to multiple reviews.

At 902, a review is received (e.g., submitted via a reviewer's electronic device 150). The review is stored (e.g., in the reviews database 310) in association with the reviewed merchant offering.

Optionally, at 904 the stored review may also be associated with a reviewer attribute (e.g., extracted from the reviewer's profile in the profiles database 320). Attributes associated with the review may be limited to reviewer attributes that are considered relevant to the category of the offering. Relevancy of attributes may be determined, for example, by a set of mappings that defines how different attributes map to different offering categories. The mappings may be predefined and/or may be generated based on deduced patterns (e.g., using machine-learning based techniques, or using human analysis) of how certain attributes are found in reviews for certain offering categories.

Optionally, at 906, in the case where the review includes a non-textual component (e.g., an audio review or a video review), speech-to-text conversion may be performed (e.g., using the speech-to-text converter 342) to generate a text component for further analysis. In some examples, speech-to-text conversion may not be required even if the review includes a non-textual component. For example, if the review includes a textual component in addition to a non-textual component, the non-textual component may be omitted from text analysis at step 910 below. In another example, keyword extraction may be performed on the non-textual component directly, without requiring conversion to text.

Optionally, at 908, the review may be identified as a positive review or non-positive (e.g., negative or neutral) review. For example, sentiment analysis may be performed (e.g., using the sentiment analyzer 346). In some examples, further analysis of the review may only be performed if the review is determined to be positive. In other examples, analysis of the review may be performed regardless of whether the review is positive, negative or neutral.

At 910, one or more keywords are extracted from the review (e.g., using the keyword extractor 344). In some examples, only keywords relevant to the category of the reviewed offering may be extracted. Keyword extraction may be performed using text analysis of the textual component (which may be the result of speech-to-text conversion) of the review. Keyword extraction may also be performed based on analysis of the non-textual component of the review, for example by speech analysis of an audio or video component.

In examples where the method 900 is performed on a plurality of reviews together, keyword extraction may be performed on the reviews together as a batch. In some examples, analysis of multiple reviews as a batch may enable the use of statistical techniques, to help ensure that the extracted keyword(s) are representative of the overall sentiments of the reviews, and may enable exclusion of outliers. For example, the keyword extraction may only extract keyword(s) that are found in more than a threshold portion of the reviews (e.g., found in at least 5% of the reviews). This may avoid the possibility that a small number of outlier reviews (e.g., one or two extremely poor reviews) distorts the overall analysis. In other examples, analysis of the reviews as a batch may extract all possible keywords, regardless of whether the keywords are all representative of the majority sentiment.

In examples where keyword(s) are extracted from a plurality of reviews, there could be a situation in which, at optional step 904, the same keyword is associated with conflicting attributes based on reviews from two (or more) different reviewers. For example, a keyword may be extracted from a review by a male reviewer and the same keyword may also be extracted from a review by a female reviewer. Such a conflict may be resolved in various ways. For example, the keyword may be associated with all attributes regardless of conflict (e.g., the keyword is associated with both "male" and "female" attributes). In another example, the keyword may be associated with the attribute that is associated with the majority of reviews where that keyword is found. In another example, the keyword may be associated with none of the conflicting attributes.

Although steps 904-910 have been described in a certain order, it should be understood that this order may be varied. For example, identification of the positive as positive or non-positive (at optional step 908) may be performed first. If the review is determined to be negative or neural, the review may be considered not suitable for further analysis and the method 900 may end. In other examples, identification of the positive as positive or non-positive (at optional step 908) may be performed after keyword extraction (at step 910) in order to enable sentiment analysis based on extracted keyword(s) extracted. Other such variations may be possible.

At 912, a search query is received (e.g., from a customer electronic device 150). It should be noted that the search query may be received from the same reviewer from whom the review was received at 902, or the search query may be from a different customer. In some examples, the search query may be received from a server or the e-commerce platform 100 itself (e.g., a preset search may be used by a server or the e-commerce platform 100 to automatically generate product alerts for customers). The search query may include one or more search keywords.

At 914, the e-commerce platform 100 uses the search engine 354 to generate a set of search results to satisfy the search query. The search results may be provided to the same device that transmitted the search query at 912 (e.g., in the case where the search results are in response to a direct search query by a customer), or may be provided to a different device (e.g., in the case where the search response are provided to a customer in response to a search query generated by a server). The search engine 354 may search all listings of merchant offerings available on the e-commerce platform 100 (e.g., by querying the data facility 134), to identify the listings that include one or more of the search keywords in the description and/or set keywords of the listing.

In the present disclosure, a listing of a merchant offering should be understood to include merchant-submitted information and may also include automatically generated information as discussed further below (e.g., with reference to FIG. 14). A listing may include a title or name of the offering, a description of the offering, and an optional representative image of the offering. A listing may also include a set of keywords (e.g., explicitly selected by the merchant) that relate to the offering. The keywords that have been set for a listing may or may not be visible to a customer viewing the listing.

The search engine 354 may also query the keywords database 330 to identify, from the stored keyword data, any merchant offerings associated with keywords that were extracted from reviews, and include listing of those merchant offerings in the search results. Thus, the search engine 354 may include a listing of a merchant offering in the search results on the basis of reviews that associate the search keyword with that merchant offering, even if the description in the listing of that merchant offering does not include the search keyword.

In some examples, there may be an explicit determination of whether the listing does or does not include the search keyword. Such a determination that a search keyword is not included in the listing may trigger generation of a recommendation to include that keyword in the listing, for example similar to the recommendation discussed further below with respect to FIG. 14.

The search results generated by the search engine 354 may be sorted and ordered to reflect how closely each search result matches the search query (e.g., based on number of matched keywords). Various suitable techniques may be used to sort and present the search results. The search results may be presented to the customer via a user interface displayed on the customer's electronic device.

Optionally, at 916, prior to presenting the search results, the search results may be filtered based on a match of one or more attributes. The attribute(s) of the customer may be determined from the customer's profile (e.g., by querying the profiles database 320). The information stored in the reviews database 310 and the keywords database 330 may be queried to determine whether a given merchant offering, which was included in the search results on the basis of a keyword extracted from a review at 914, was reviewed by a reviewer having attribute(s) that match to the customer's attribute(s) (e.g., same age group, same gender, same marital status, same geographical area, etc.). A match may be determined even if not all of the customer's attributes match the reviewer's attributes. For example, it may be sufficient that certain key attributes (e.g., age group and gender) match. The attribute(s) that are considered key for determining a match may be dependent on the search. If the key attribute(s) does not match, then a match may not be determined even if other non-key attribute(s) match. For example, if the search is for an offering in the cosmetics category, a key attribute may be skin type whereas a non-key attribute may be height.

In some examples, if the number of matching attributes between the reviewer and the customer is insufficient (e.g., below a predefined threshold number, such as requiring at least three matching attributes; or the key attribute does not match, even if other attributes match), that associated merchant offering may be excluded from the search results presented to the customer. Further, in some examples, even if the attribute(s) of the reviewer match the attribute(s) of the customer, the associated merchant offering may be included in the search results only if the review was determined to be a positive review. In this way, the search results may be better tailored to the customer, in order to provide a more accurate and efficient process for the customer to discover merchant offerings of interest.

In some examples, in addition to an exact match of attributes, a similarity between reviewer and customer may be determined. Various techniques may be used to determine similarity of attributes between a reviewer and a customer. The various techniques may be used together. For example, a technique may be by determining whether there is a similar range of values in attributes. For example, a 25-year-old reviewer and a 23-year-old customer can be similar because they both fall into the 19-to-29-year-old category. Another technique may be by assigning a numerical value to each attribute (e.g., height, shoe size, age, income, etc.) and representing the reviewer and customer as respective vectors of numbers; a correlation may then be calculated between the reviewer vector and the customer vector, to arrive at a numerical value representing the similarity between the reviewer and the customer (e.g., a correlation value of 1 may represent 100% similarity, and a correlation value of 0 may represent 0% similarity). It should be understood that other approaches may be used. The similarity may be calculated as a similarity score (e.g., using the correlation value as the similarity score) which may be used, in addition to exactly matched attributes, to determine whether a reviewer is a good match with a customer.

In some examples, the steps 914 and 916 may be performed together as a single operation. For example, the search engine 354, when querying the data facility 134 for possible search results, may specifically query for results associated with reviewers that match the customer.

In some examples, when the search results are presented to the customer in a user interface, the user interface may also include an option for the customer to view the review(s) associated with each listing in the search results. In examples where the match between the reviewer and the customer was taken into account, the search results may also include an indicator of matched attributes.

In some examples, the steps 902-910 and the steps 912-916 may take place at separate times, and need not immediately follow in time. For example, the e-commerce platform 100 may analyze stored reviews and generate keyword data to be stored in the keywords database 330 for future use. At some future time, the search engine 354 may access the keywords database 330 to satisfy a search query.

Figure 10:
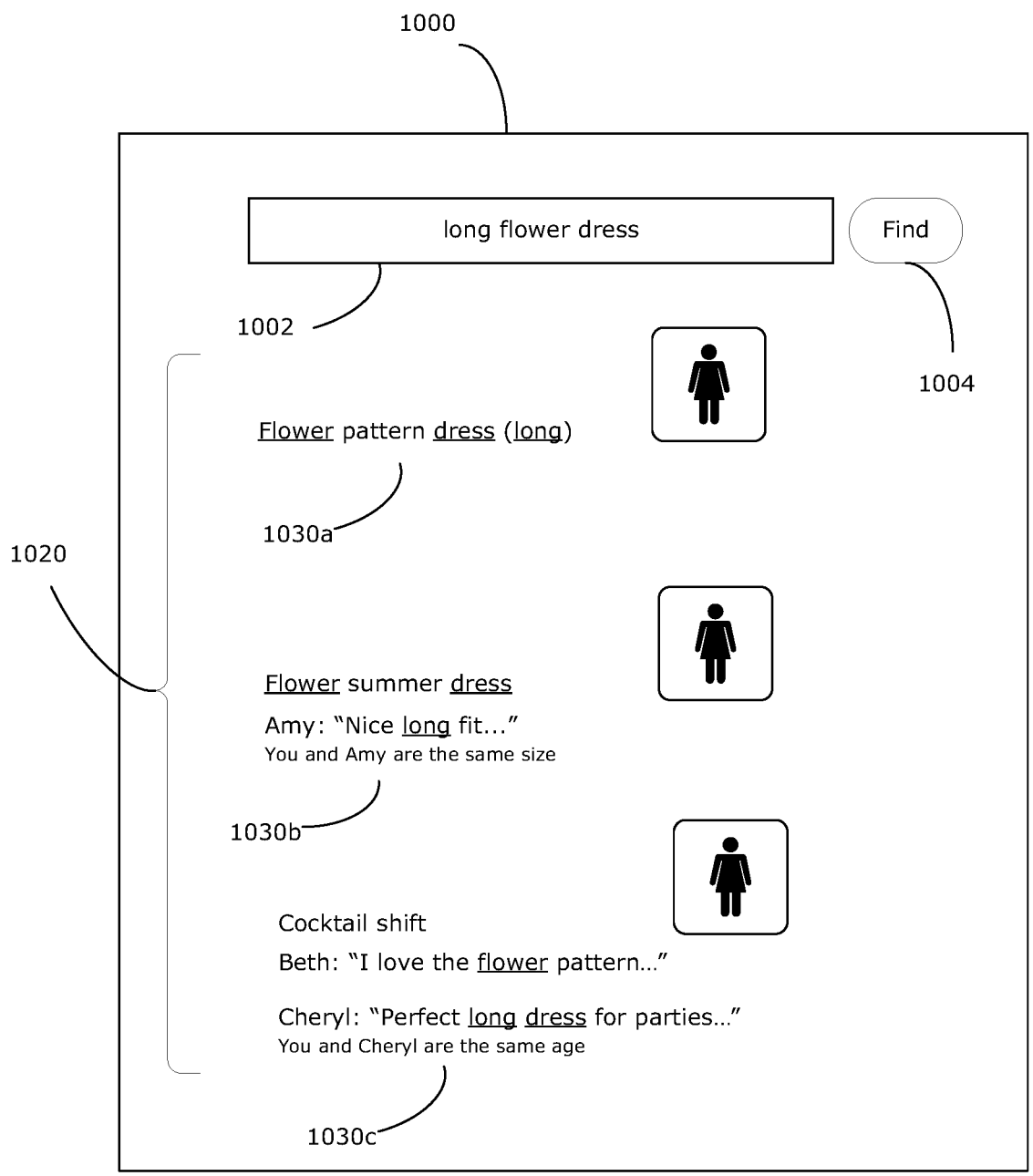
FIG. 10 illustrates an example user interface that may be presented as part of the method of FIG. 9.

FIG. 10 shows a representative user interface 1000 that a customer may use to search for merchant offerings. The user interface 1000 may be generated by the e-commerce platform 100 and displayed to the customer on the customer's electronic device 150. The user interface 1000 may be generated using the method 900 discussed above.

In this example, the user interface 1000 includes a query input field 1002 and a search button 1004 to enable the customer to enter and submit a keyword-based search string (in this example "long flower dress").

The search engine 354 generates a set of search results 1020 (only three search results shown here for simplicity). Each search result includes a listing of the merchant offering, which may include a product/service name and optionally a representative image of the offering. When applicable, the search result may also include reviews and/or indication of match with reviewer. The customer may select (e.g., click on) a listing to view details of the offering and/or purchase the offering. For example, selecting a listing may result in navigation to the merchant's storefront to view details of the offering and/or purchase the offering. The customer may also select (e.g., click on) a review to view the details of the review. For example, selecting a review for an offering may result in navigation to a page showing all reviews associated with that offering.

In this example, underlining is used to indicate where the search result matches keywords in the search query. In the first listing 1030*a*, the description of the merchant listing includes all the keywords in the search query. This listing 1030*a* may be identified by the search engine 354 based on a match between the description of the merchant offering and the search query. In the second listing 1030*b*, not all search keywords are found in the description, but the search result further displays a review (from reviewer Amy) that includes a search keyword. Thus, the keyword "long" extracted from the review may be used to augment the listing 1030b and improve the ranking of the listing 1030b in the search results 1020. Further, the search result indicates a match between the reviewer and the customer, which may further improve the ranking of the listing 1030b. In the third listing 1030c, the search keywords are not present in the description of the merchant offering. However, the search keywords are found in reviews associated with the merchant offering.

The search results provided in this example illustrate how, using the method 900 for example, keywords extracted from reviews may be used to enhance the results provided in response to a search query. In this way, the customer may discover the listing 1030c which would otherwise not be found using conventional search methods, thus improving the discovery process for the customer.

In some examples, where a listing is included in the search results on the basis of matching attribute(s) (e.g., at optional step 916), the method 900 may enable search results to be tailored for specific attributes, such as regional dialect or demographic-based slang. For example, a search query that uses a keyword with a regional-specific meaning (and that could have a different meaning in a different region) can be more accurately satisfied when the geographical attribute (e.g., country) of the customer is taken into account.

In some aspects of the present disclosure, the information extracted from reviews may be used to enhance a customer's discovery process, for example through generation of recommendations.

Figure 11:
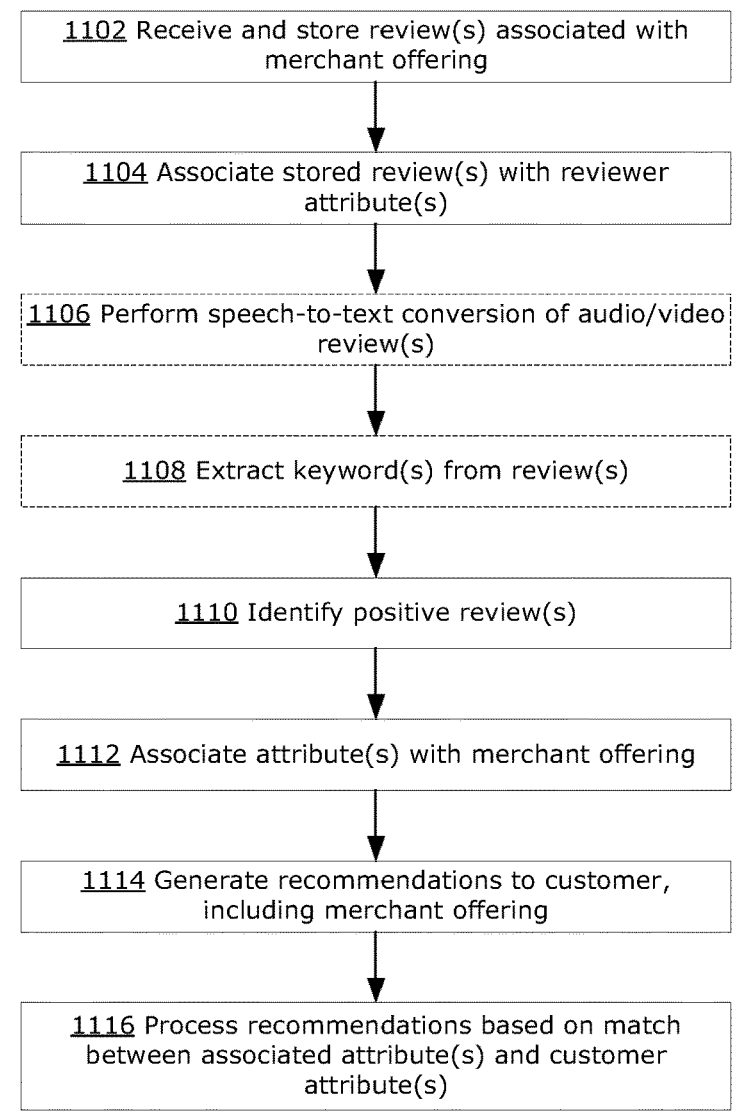
FIG. 11 is a flowchart illustrating an example method for using information extracted from reviews to generate recommendations.

FIG. 11 is a flowchart illustrating an example method 1100 for using information extracted from reviews to generate recommendations to a prospective customer. The method 1100 may be implemented by the e-commerce platform 100 (e.g., using the analytics facility 132 and/or services 116 at the core server 710). The method 1100 may be implemented by a processing device executing instructions. The method 1100 will be described as being carried out on a plurality of reviews associated with a single merchant offering; however, it should be understood that the method 1100 may also be carried out using a single review. Further, as discussed above with reference to the method 900, in some examples the method 1100 may be performed in the context of a plurality of reviews associated with various merchant offerings (e.g., using batch analysis techniques on a batch of reviews).

At 1102, reviews are received and stored (e.g., similar to 902 described above) in association with the reviewed merchant offering.

At 1104 each stored review is associated with a reviewer attribute (e.g., extracted from the profile of the respective reviewer in the profiles database 320). Association of reviewer attribute with a review may be performed together with step 1102, for example, such that reviewer attribute(s) may be associated with the review at the time the review is created and submitted by the reviewer. Attributes associated with a review may be limited to reviewer attributes that are considered relevant to the category of the offering. Relevancy of attributes may be determined, for example, by a set of mappings that defines how different attributes map to different offering categories, as discussed above with reference to step 904. In some examples, if a stored review cannot be associated with a reviewer attribute (e.g., the reviewer does not have any attributes relevant to the category of the merchant offering), that review may be omitted in subsequent steps of the method 1100.

Optionally, at 1106, in the case where there is a non-textual review (e.g., an audio review or a video review), speech-to-text conversion may be performed (e.g., using the speech-to-text converter 342) to generate a text component for further analysis. In some examples, speech-to-text conversion may not be required even if the review includes a non-textual component. For example, if the review includes a textual component in addition to a non-textual component, the non-textual component may be omitted from text analysis at step 910 below. In another example, keyword extraction may be performed on the non-textual component directly, without requiring conversion to text.

Optionally, at 1108, one or more keywords may be extracted from the reviews (e.g., using the keyword extractor 344). In some examples, only keywords relevant to the category of the reviewed offering may be extracted. The keyword extraction may be performed on the reviews together in a batch, or individually.

At 1110, a set of positive review(s) is identified, for example using sentiment analysis (e.g., using the sentiment analyzer 346). The identification of the set of positive review(s) may be based on extracted keywords, if keyword extraction was performed (at optional step 1108). The identification of the set of positive review(s) may also be performed based on a quantitative indicator (e.g., a star rating) included in each review, for example by applying threshold(s) to sort the reviews into positive and negative (and optionally neutral) reviews. In some examples, further steps of the method 1100 may be performed only for the set of positive review(s).

Although steps 1104-1110 have been described in a certain order, it should be understood that this order may be varied. For example, identification of positive review(s) (at step 1110) may be performed prior to associating reviewer attribute(s) with each review (at step 1104), such that any non-positive review may be excluded from attribute association. Other such variations may be possible.

At 1112, at least one of the reviewer attributes associated with the identified positive review(s) is further associated with the reviewed merchant offering. Such association may be stored with data related to the merchant offering (e.g., stored in a data structure together with the description of the merchant offering and an image of the merchant offering). In other examples, such association may not be explicitly stored with the merchant offering, but rather may be reference via associations stored in keyword data and/or review data, as discussed above. As a result of step 1112, the merchant offering becomes associated with attribute(s) of reviewer(s) who gave positive review(s) for that merchant offering.

In some examples, the association between the merchant offering and the attribute(s) may include an indicator of how strongly each attribute is correlated with positive reviews. For example, after identifying the set of positive review(s) at step 1110, a correlation calculation may be performed to determine how strongly each reviewer attribute is correlated with positive reviews compared to negative reviews. For example, if there are equal numbers of positive and negative reviews from male reviewers, the attribute "male" may not be strongly correlated with positive reviews for the merchant offering. In contrast, if reviewers in the age group 19-25 years old are associated with only positive reviews and no negative reviews, this may be a strong correlation between the attribute "19-25 years old" and positive reviews for the merchant offering.

At 1114, when a customer accesses the e-commerce platform 100 (e.g., logs onto the e-commerce platform 100 via the customer's electronic device 150), a set of recommendations is generated for that customer (e.g., by the recommendations engine 352). The set of recommendations may be generated based on, for example, the customer's recent (e.g., within the past week) activity on the e-commerce platform 100 (e.g., recent viewing of merchant storefronts, recent viewing of merchant offerings, recent search queries, recent selection of displayed advertisements, etc.). For example, the recommendations engine 352 may query the customer's profile to determine the customer's recent activity and identify a category of merchant offering in which the customer was recently active. The recommendations engine 352 may then query merchant offerings (e.g., using the data facility 134) to identify merchant offerings that fit that category. Various techniques for generating recommendations to a customer may be used, including rules-based techniques, statistical techniques and machine-learning based techniques, the details of which are not discussed herein.

At 1116, the recommendations are processed based on a match between the customer and one or more of the reviewer attribute(s) associated with the merchant offering is determined. Various techniques for determining match of attributes are possible, some of which have been discussed above with reference to step 916 and will not be repeated here. Processing the recommendations may include filtering the recommendations such that only offerings associated with reviewer attributes that match the customer's attributes are included. In some examples, only attributes strongly correlated with positive reviews may be considered when performing the filtering.

As a result, the merchant offering is included in the set of recommendations only if the reviewer attribute(s) associated with the merchant offering match the customer's attribute(s). Processing the recommendations may also include sorting the recommendations based on match with customer attributes. This may result in offerings that are associated with reviewer attributes that match the customer's attributes being ranked higher in the recommendations, compared to other offerings without such matching of attributes. In some examples, the recommendations may be further sorted based on how strongly each attribute correlates with positive reviews.

In some examples, steps 1114 and 1116 may be performed together, or in a different order. For example, the generation of recommendations may take into account the customer's attributes at the same time, such that the initially generated recommendations are already limited to those merchant offerings associated with reviewer attributes that match the customer's attributes.

In some examples, the steps 1102-1112 and the steps 1114-1116 may take place at separate times, and need not immediately follow in time. For example, the e-commerce platform 100 may analyze stored reviews and store association between reviewer attributes and merchant offerings for future use. At some future time, the recommendations engine 352 may access stored association to generate recommendations as discussed above.

Figure 12:
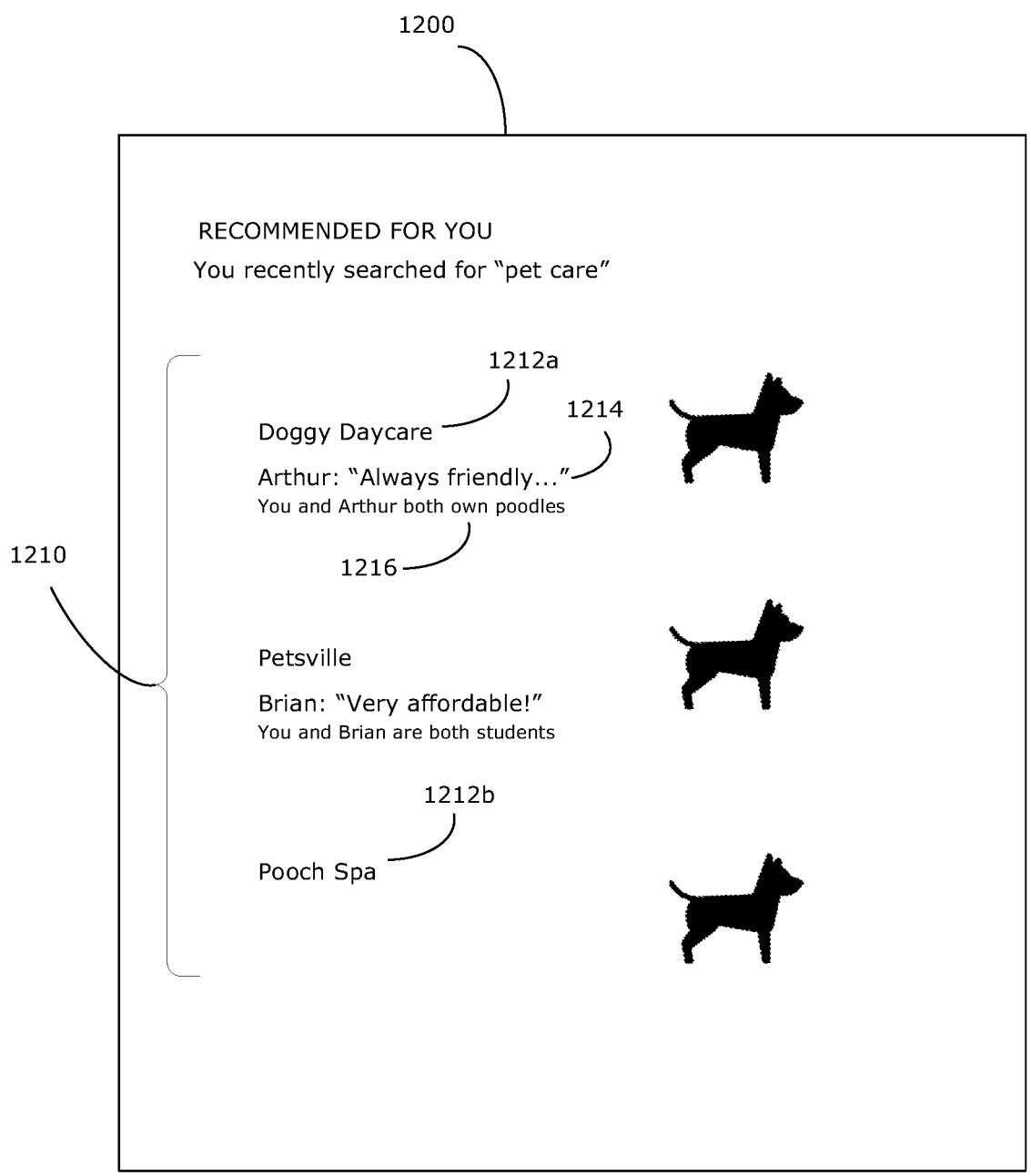
FIG. 12 illustrates an example user interface that may be presented as part of the method of FIG. 11.

FIG. 12 shows a representative user interface 1200 that may be presented to a customer, to provide recommendations. The user interface 1200 may be generated by the e-commerce platform 100 and displayed to the customer on the customer's electronic device 150. The user interface 1200 may be generated using the method 1100 discussed above.

In this example, the user interface 1200 includes a set of recommendations 1210. Here, the set of recommendations 1210 may be generated based on the customer's recent search history. A recommended listing 1212a may include a description of the offering and optionally an image representing the offering. In the case where the listing 1212a of the offering was included in the recommendations 1210 on the basis of a match an attribute of a reviewer for that offering, the associated review 1214 and the matching attribute 1216 may also be presented. The customer may select (e.g., click on) a listing to view details of the offering and/or purchase the offering. The customer may also select (e.g., click on) a review to view the details of the review. The recommendations 1210 may also include a recommended listing 1212b that is not associated with a review. For example, the listing 1212b may be recommended because it is in a category that was recently searched by the customer, but the listing 1212b may not be associated with a positive review by a reviewer having attributes that match the customer's attributes.

In some examples, when the recommendations are presented to the customer in the user interface 1200, the user interface 1200 may also include an option for the customer to view the review(s) associated with each listing in the recommendations. For example, selecting (e.g., clicking on) the review 1214 under the listing 1212a may cause the full text of the review 1214 to be displayed, such as by showing a pop-up dialog box or by navigating to a page showing all reviews associated with the listed merchant offering.

Selecting one of the listed recommendations 1210 may result in navigation to the merchant storefront, where the customer can view further details of the offering and/or purchase the offering.

The recommendations provided in this example illustrate how, using the method 1100 for example, a match of reviewer attributes and sentiment analysis of reviews may be used to enhance the recommendations presented to a customer. In this way, generated recommendations may prioritize the listing 1212a which is more likely to be of interest to the customer, thus improving the discovery process for the customer.

Figure 13:
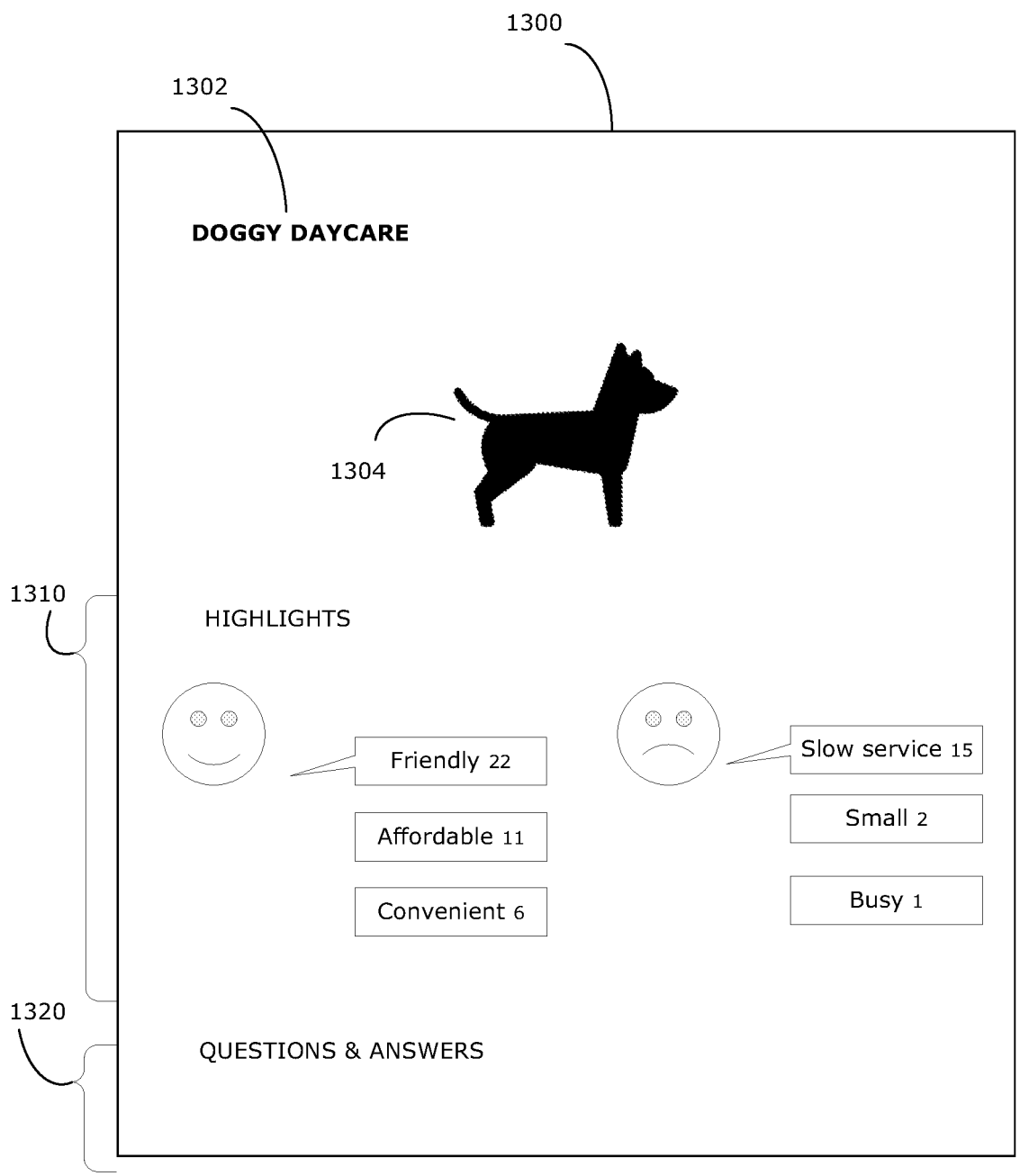
FIG. 13 illustrates an example user interface that may be used to present a listing of a merchant offering.

FIG. 13 shows an example user interface 1300 that may be displayed in response to a selection of a listing. In this example, the user interface 1300 corresponds to the listing 1212a from the user interface 1200. However, it should be understood that a similar user interface 1300 may be displayed in response to selection of a listing from the interface 1000 discussed earlier.

In addition to the merchant-provided description 1302 and representative image 1304 for the merchant offering, the user interface 1300 may be further populated with information extracted from customer feedback. The extracted information may include keywords extracted from reviews, an indication of sentiments from reviews and/or attributes of reviewers, among other possibilities.

In the example shown, the user interface 1300 includes a keyword section 1310 that presents keywords extracted from reviews associated with the offering. To avoid visual clutter, only a few most common keywords may be displayed. Alternatively, the displayed keywords may be associated with the reviews that have been rated (e.g., based on community feedback) as being the most helpful. The keywords may be sorted based on the sentiment (e.g., positive or negative) associated with the respective review. Further, the keywords may be displayed together with an indicator (e.g., a numerical indicator) of how many reviews contain the respective keyword.

The user interface 1300 may include other sections, which may be displayed by the user scrolling down the interface 1300. In FIG. 13, a portion of a questions & answers section 1320 is shown. The questions & answers section 1320 may contain frequently asked questions (which may be merchant-submitted default questions) and associated answers. Other information (e.g., pricing) about the merchant offering may be displayed by scrolling down the interface 1300.

In some aspects of the present disclosure, the information extracted from reviews may be used to enhance a product listing, for example by assisting in creation or updating of a merchant-submitted description in the listing.

Figure 14:
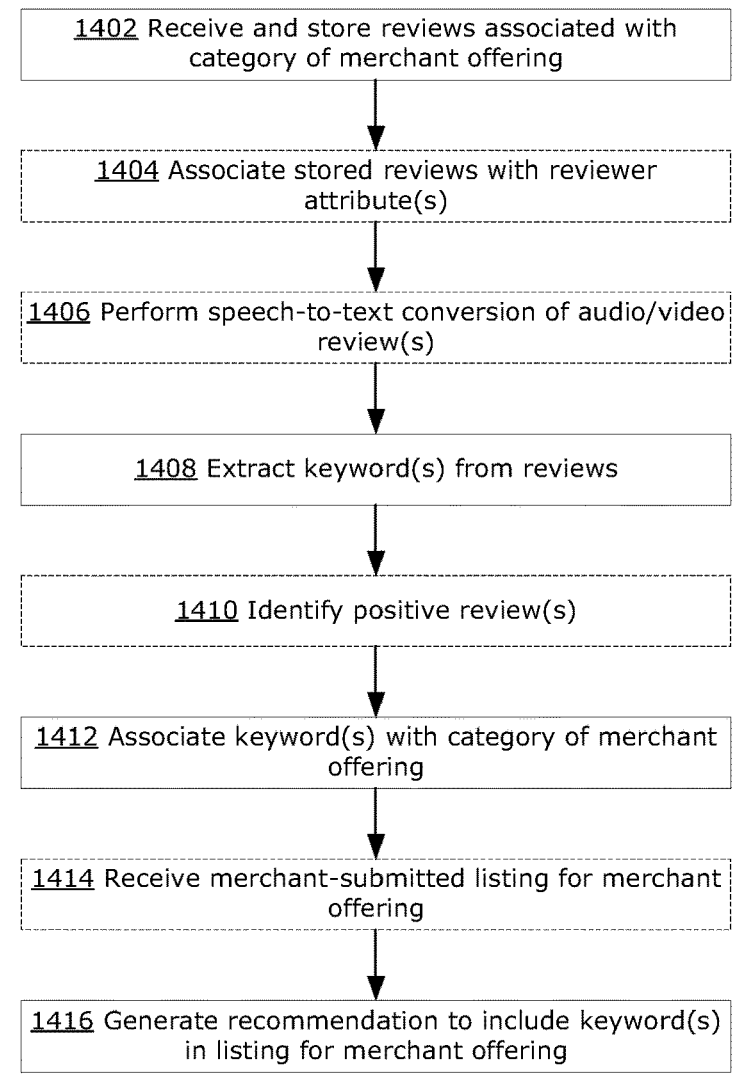
FIG. 14 is a flowchart illustrating an example method for using information extracted from reviews to generate a recommendation to include one or more keywords in a listing.

FIG. 14 is a flowchart illustrating an example method 1400 for using information extracted from reviews to generate a recommendation to include one or more keywords in a listing. The method 1400 may be implemented by the e-commerce platform 100 (e.g., using the analytics facility 132 and/or services 116 at the core server 710). The method 1400 may be implemented by a processing device executing instructions. The method 1400 will be described as being carried out on a plurality of reviews associated with a category of merchant offering; however, it should be understood that the method 1400 may also be carried out on reviews associated with a specific merchant offering.

At 1402, reviews are received and stored (e.g., similar to 902 and 1102 described above) in association with a reviewed merchant offerings. Each review may be further associated with a category of the reviewed offering. Categories of offerings may be predefined (e.g., category definitions may be defined by the e-commerce platform) and associated with each merchant offering. For example, when a merchant creates a new listing for an offering, the new listing may require an identification of at least one category to which the offering belongs. In some examples, a merchant may not be required to explicitly identify the category and the e-commerce platform 100 may instead analyze the listing (e.g., the text of the product description) to identify the relevant category (e.g., using natural language processing algorithms and/or machine-learning algorithms). For example, review data stored in the reviews database 310 may, in addition to storing the merchant offering ID to identify the reviewed offering, also store the category of the review merchant offering.

Optionally, at 1404 each stored review is associated with a reviewer attribute (e.g., extracted from the profile of the respective reviewer in the profiles database 320). Association of reviewer attribute with a review may be performed together with step 1402, for example, such that reviewer attribute(s) may be associated with the review at the time the review is created and submitted by the reviewer. Attributes associated with a review may be limited to reviewer attributes that are considered relevant to the category of the offering, similar to step 1104 discussed above. In other examples, attributes associated with a review may include attributes that are more general and broadly relevant to many or all categories of merchant offerings (e.g., age, geographical location, marital status, etc.).

In some examples, a group of attributes may be used together to determine a higher-level attribute to associate with the review. For example, gender and marital status attributes may be used together to determine "bachelor" as a higher-level attribute that may be associated with a review. In this way, demographical attributes and other higher-level attributes may be associated with a review.

Optionally, at 1406, in the case where there is a non-textual review (e.g., an audio review or a video review), speech-to-text conversion may be performed (e.g., using the speech-to-text converter 342) to generate a text component for further analysis. In some examples, speech-to-text conversion may not be required even if the review includes a non-textual component. For example, if the review includes a textual component in addition to a non-textual component, the non-textual component may be omitted from text analysis at step 910 below. In another example, keyword extraction may be performed on the non-textual component directly, without requiring conversion to text.

At 1408, one or more keywords are extracted from the reviews (e.g., using the keyword extractor 344). In some examples, only keywords relevant to the category of the reviewed offering may be extracted. The keyword extraction may be performed on the reviews together in a batch, or individually.

Optionally, at 1410, a set of positive review(s) is identified, for example using sentiment analysis (e.g., using the sentiment analyzer 346). The identification of position review(s) may be based on extracted keywords. The identification of position review(s) may also be based on a quantitative indicator (e.g., a star rating) included in each review, for example by applying threshold(s) to sort the reviews into positive and negative (and optionally neutral) reviews. In some examples, if optional step 1410 is performed to identify the set of positive review(s), further steps of the method 1400 may be performed only for the set of positive review(s).

Although steps 1404-1410 have been described in a certain order, it should be understood that this order may be varied. For example, optional identification of positive review(s) (at step 1410) may be performed prior to associating reviewer attribute(s) with each review (at step 1404), such that any non-positive review may be excluded from attribute association. Similarly, optional identification of positive review(s) may be performed prior to extracting keyword(s) from reviews (at step 1408), such that keywords are only extracted from positive reviews.

At 1412, at least one keyword extracted from the reviews is associated with the category of the reviewed merchant offering. Such association may be stored with the keyword (e.g., stored in the data structure for keyword data 331 in the keywords database 330). In some examples, a keyword extracted from a given review of a given merchant offering may also be associated with that specific given merchant offering. If one or more reviewer attributes were determined at optional step 1404, the keyword may also be associated with the determined attribute(s). This may enable keywords to be tailored to specific attribute(s) (e.g., keywords tailored to specific regional dialects, or to specific age-driven slang).

Optionally, at 1414 a merchant-submitted listing for a merchant offering is received (e.g., via the merchant's electronic device 102). The merchant-submitted listing may be a complete listing (e.g., including a full description for the product), may be a partial listing (e.g., including only a title for the product) or may be an in-progress partial entry (e.g., the merchant-submitted listing is a real-time input of the product description, such as real-time text entry into an input field).

At 1416, a recommendation is generated (e.g., by the description generator 356), to be presented to a merchant (e.g., via the merchant's electronic device 102), to include a keyword in a listing for a merchant offering. The recommendation of the keyword is generated based on the keyword having been associated (at step 1412) with the category of the merchant offering. In particular, the recommended keyword may be a keyword that has not been selected by the merchant to include in the listing, or that may be missing from the product description.

For example, if the merchant submitted a complete listing at optional step 1414, the description generator 356 may parse the merchant-submitted listing to determine if one or more keywords extracted from reviews relevant to the offering category should be included in the listing. If so, the description generator 356 may present a dialog to the merchant to enable the merchant to accept or reject the recommended keyword(s) for inclusion in the listing.

Figure 15A:
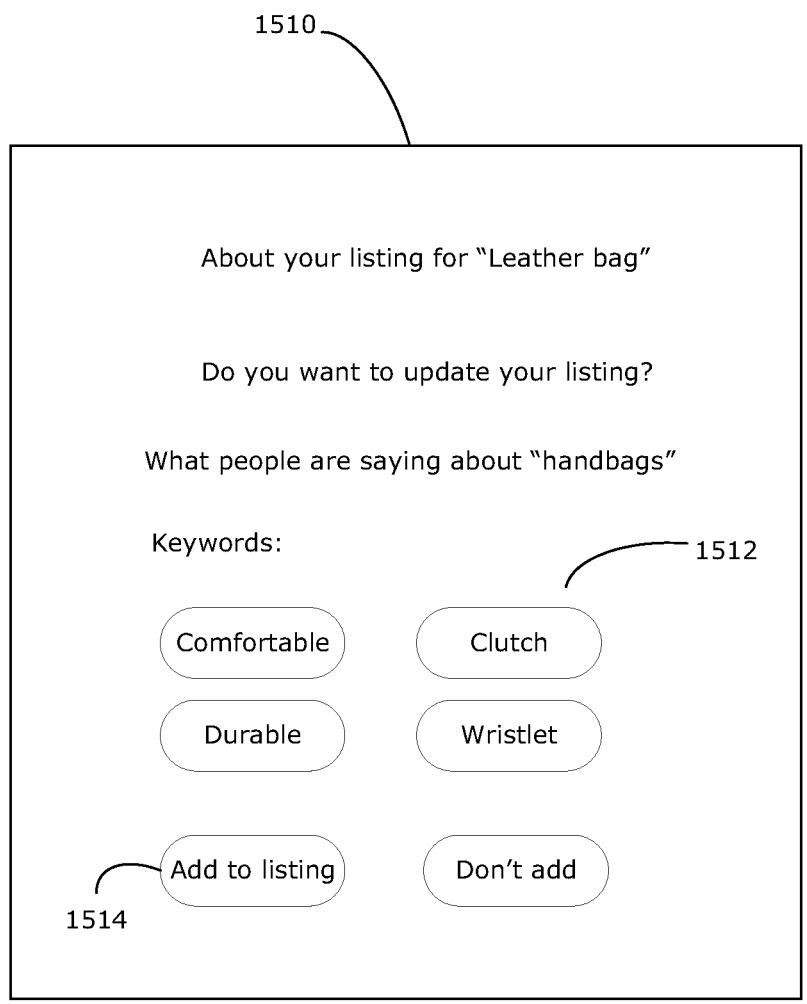
FIGS. 15A-15D illustrate example user interfaces that may be presented as part of the method of FIG. 14.

FIG. 15A shows an example of a dialog 1510 that may be presented to a merchant (e.g., when the merchant submits a new listing for an offering, in this example "Leather bag"). In this example, the dialog 1510 identifies keywords 1512 that have been associated with the offering category (in this example "handbags"), indicates that the keywords 1512 are not currently part of the listing for the merchant offering, and provides an option 1514 to add (or not add) the keywords 1512 into the listing. In some examples, the dialog 1510 may provide an option (e.g., using checkboxes) for the merchant to select which of the keywords 1512 to include.

In another example, if the merchant-submitted listing at optional step 1414 is a partial entry, such as a real-time entry (e.g., using an online form provided by the e-commerce platform 100), the description generator 356 may, based on the information in the partial entry, present one or more keywords that the merchant can select for inclusion in the listing. The description generator 356 may additionally or alternatively provide an autocomplete function. The autocomplete function may use a text prediction algorithm together with the keywords associated with the offering category to suggest words and/or phrases for the offering description. The autocomplete function may present suggested text strings in real-time as the description is being inputted by the merchant, for example.

Figure 15B:
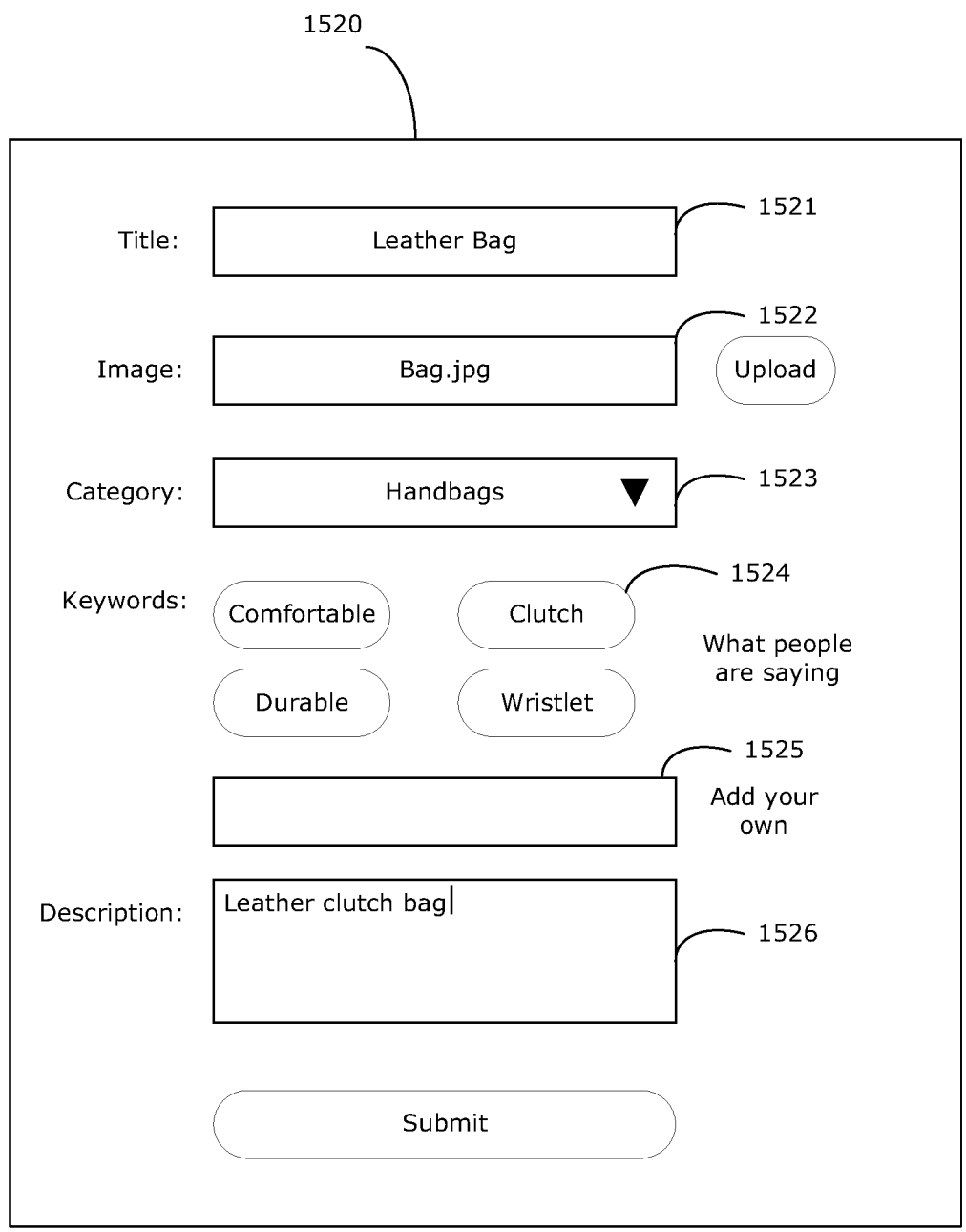

FIG. 15B shows an example of a user interface 1520 that may be used by a merchant to submit a listing for an offering. In this example, the user interface 1520 includes fields 1521, 1522, 1523 for, respectively, inputting a title for the offering, uploading a representative image, and selecting an offering category. In particular, the user interface 1520 provides keywords 1524, associated with the selected category, that can be selected to include in the listing. The user interface 1520 in this example also includes fields 1525, 1526 for, respectively, inputting the merchant's own keywords, and inputting an offering description.

Figure 15C:
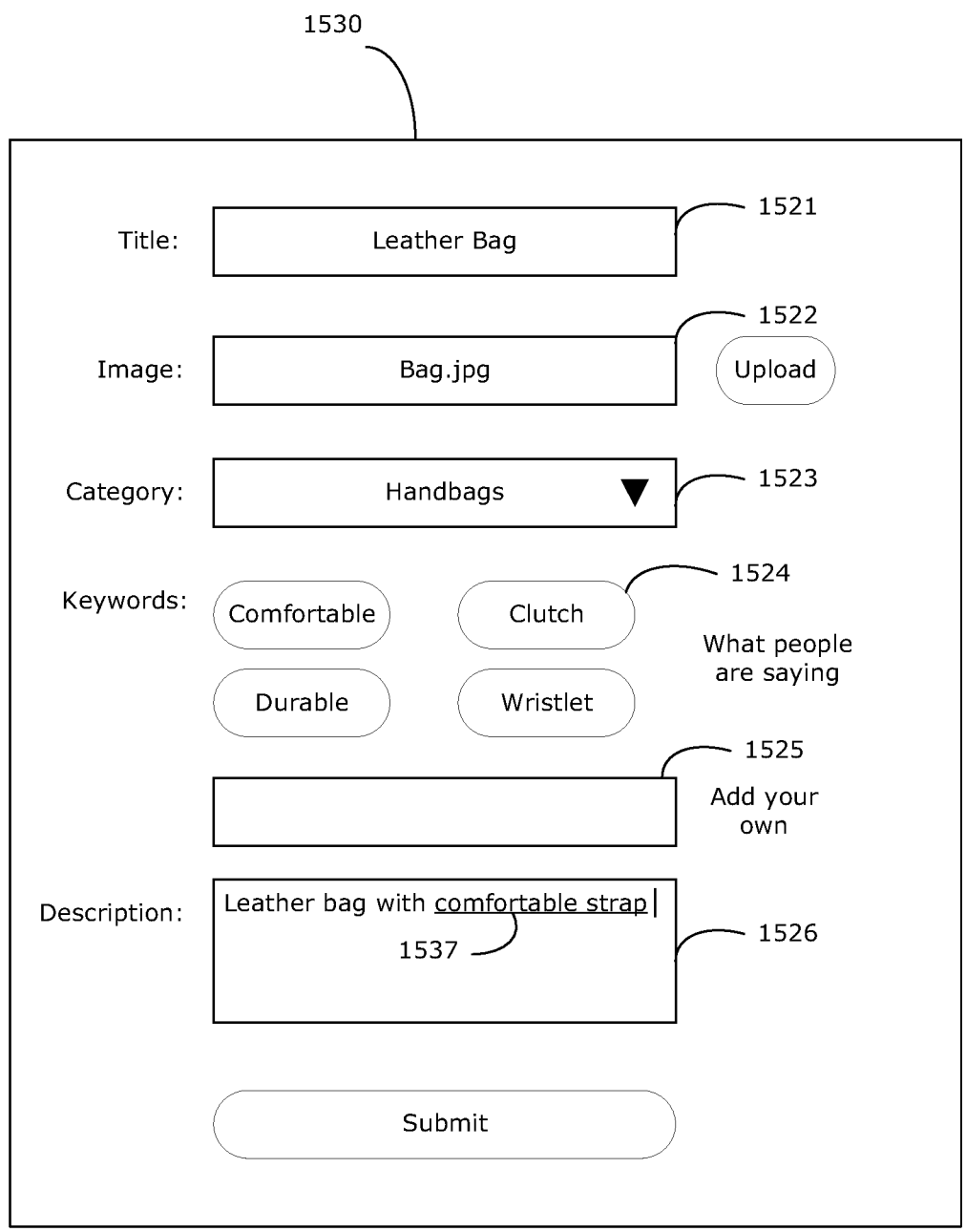

FIG. 15C shows an example of a user interface 1530 that is similar to the user interface 1520, with similar fields 1521, 1522, 1523, 1524, 1525 and 1526. Additionally, the user interface 1530 provides an autocomplete function that generates text string (underlined text 1537) based on keywords associated with the offering category.

In another example, the merchant-submitted listing at optional step 1414 may be a partial entry that does not include an offering description. For example, the merchant may simply submit an offering category (or a title for the offering, from which the category may be identified). The description generator 356 may then use the keywords associated with the category to generate a full description for the offering, without requiring the merchant to manually submit the description. The description generator 356 may, for example, store description a template for the offering category and may populate the template with keywords extracted from reviews.

Figure 15D:
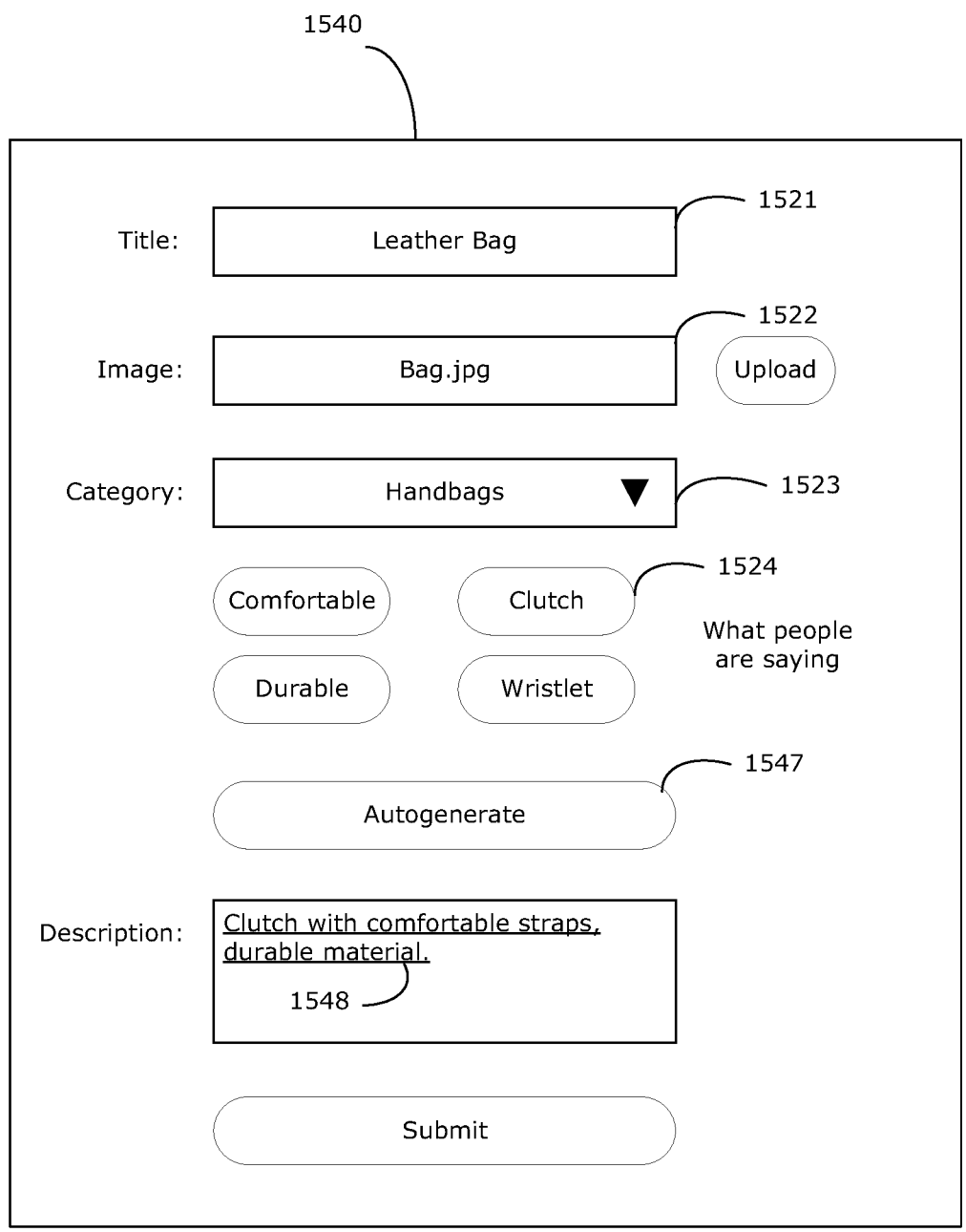

FIG. 15D shows an example user interface 1540 that is similar to the user interface 1520. However, the user interface 1540 includes an autogenerate option 1547 that automatically generates a full description (underlined text 1548) for the listing, based on keywords associated with the offering category.

In examples where optional step 1414 is omitted, the recommendation may be generated for a merchant-submitted listing that was previously submitted and stored. For example, the description generator 356 may automatically (e.g., at regular intervals) or in response to a merchant input (e.g., selection of an update option from a merchant dashboard) compare a current listing for the merchant offering with extracted keywords for that category. If the current listing is missing one or more extracted keywords, the merchant may be presented with an option (e.g., using the dialog 1510) to include the keywords in the listing.

In some examples, if optional step 1404 is performed to associate reviewer attribute(s) with reviews, and subsequently attribute(s) are associated with keyword(s), the recommendation to include keyword(s) (at step 1416) may be specific to one or more attributes. For example, if a given keyword is associated with a geographical attribute (e.g., associated with a particular country), then the recommendation to include that keyword may be specific for a listing for that country. A merchant may want an attribute-specific listing, with attribute-specific keywords, to be shown to prospective customers matching that attribute, for example (e.g., a Canadian listing that have keywords based in Canadian dialect should be shown to a prospective customer having a Canadian home address). In this way, there may be multiple attribute-specific listings created for the same merchant offering.

In some examples, the steps 1402-1412 and the steps 1414-1416 may take place at separate times, and need not immediately follow in time. For example, the e-commerce platform 100 may analyze stored reviews and store association between keywords and offering categories for future use. At some future time, the description generator 356 may access the stored association to generate recommended keywords as discussed above.

Thus, in the method 1400, the description generator 356 may enhance a full or partial entry of a merchant-submitted listing for an offering by suggesting keyword(s) to include in the listing, by providing autocomplete suggestions for a description in the listing and/or by autogenerating a description for the listing.

In various examples, the present disclosure describes how associations between different sets of information may be used to improve the customer and merchant experience using the e-commerce platform 100. In some examples, associations that are generated (e.g., between attributes, sentiments, keywords, offering categories and merchant offerings) may be explicitly stored (e.g., in review data or keyword data). In other examples, such associations may not be explicitly stored. For example, such associations may be made on-the-fly (e.g., in response to receiving a search query), which may reflect a more up-to-date and dynamic state of reviews.

It should also be understood that associations that have been identified may be updated (e.g., modified, new associations added or old associations removed) based on more up-to-date information. The e-commerce platform 100 may automatically perform such refreshing of associations periodically, intermittently, and/or in response to a trigger event. For example, associations between keywords extracted from reviews and an offering category may be made based on reviews from a defined moving window of time (e.g., reviews from the past three months). Over time, keywords that become stale (e.g., no longer found in more recent reviews in the past three months) may lose association with the offering category and newer keywords may become associated with the offering category. In another example, there may be defined finite number of associated keywords permissible for each offering category. Using a first-in-first-out approach, keywords extracted from older reviews may become replaced with keywords extracted from newer reviews.

Although the methods 900, 1100, 1400 have been described above as separate methods, it should be understood that the methods 900, 1100, 1400 may be used together, may be combined into a single method, and/or may interact together. For example, the analysis of review for keyword extraction and sentiment analysis may only need to be performed once across of the methods 900, 1100, 1400. After the information has been extracted from the reviews and stored in the relevant databases, each of the search engine 354, the recommendations engine 352 and the description generator 356 may query the databases to access the extracted information, without having to repeat the analysis.

In another example, consider a case in which the method 900 is used to provide search results that include a listing for an offering, based on keywords used in the search query and associated with reviews for that offering. If the listing for the offering does not already include those keywords, the method 1400 (or at least step 1416) may be used to generate a recommendation to include those keywords into the listing. In this way, the method 1400 for enhancing a listing may be triggered by or combined with the method 900 for enhancing search results.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A system comprising:
a processor in communication with a storage, the processor configured to execute instructions to cause the system to:
identify, based on reviewer profiles of reviewers associated with a set of reviews associated with a merchant offering, at least one reviewer characteristic of one or more reviewers associated with one or more reviews in the set of reviews associated with the merchant offering;
determine a match between a customer characteristic, identified based on a first customer profile, and the at least one reviewer characteristic by correlating a reviewer vector with a customer vector, the reviewer vector representing each of the at least one reviewer characteristic as a respective numerical value in the reviewer vector, and the customer vector representing the customer characteristic as a respective numerical value in the customer vector; and
responsive to the determined match between the customer characteristic and the at least one reviewer characteristic of the one or more reviewers associated with the one or more reviews in the set of reviews associated with the merchant offering, generate a set of recommendations to be presented, via a customer electronic device associated with the first customer profile, the set of recommendations relating to the merchant offering.

2. The system of claim 1, wherein the instructions further cause the system to:
identify the set of reviews associated with the merchant offering from amongst one or more stored reviews based on quantitative ratings associated with the one or more stored reviews.

3. The system of claim 1, wherein the set of reviews associated with the merchant offering is identified from amongst one or more stored reviews based on keywords associated with each of the one or more stored reviews.

4. The system of claim 3, wherein the one or more stored reviews include a non-textual review having an audio component, wherein the instructions further cause the system to:
convert the audio component to a textual component using speech-to-text conversion; and
extract the keywords associated with the non-textual review from the textual component using text analysis.

5. The system of claim 1, wherein the instructions further cause the system to:
determine a strength of correlation between the at least one reviewer characteristic and the one or more reviews in the set of reviews associated with the merchant offering; and
store an association between the at least one reviewer characteristic and the merchant offering, the association including an indicator of correlation representing the strength of correlation between the at least one reviewer characteristic and the set of reviews associated with the merchant offering.

6. The system of claim 5, wherein the set of reviews associated with the merchant offering is a set of positive reviews, and wherein the strength of correlation is determined based on a measured occurrence of the at least one reviewer characteristic in the set of positive reviews compared to a measured occurrence of the at least one reviewer characteristic in a set of non-positive reviews for the merchant offering.

7. The system of claim 5, wherein presentation of the set of recommendations is ordered based on the indicator of correlation.

8. The system of claim 1, wherein the set of recommendations selectively includes the merchant offering based on whether the one or more of the reviews in the set of reviews associated with the merchant offering are positive reviews or non-positive reviews.

9. The system of claim 1, wherein the set of reviews associated with the merchant offering is a set of positive reviews associated with the merchant offering and wherein the set of recommendations includes the merchant offering.

10. The system of claim 1, wherein reviews of the set of reviews associated with the merchant offering are identified as positive or non-positive reviews using sentiment analysis.

11. A method comprising:
identifying, based on reviewer profiles of reviewers associated with a set of reviews associated with a merchant offering, at least one reviewer characteristic of one or more reviewers associated with one or more reviews in the set of reviews associated with the merchant offering;
determining a match between a customer characteristic, identified based on a first customer profile, and the at least one reviewer characteristic by correlating a reviewer vector with a customer vector, the reviewer vector representing each of the at least one reviewer characteristic as a respective numerical value in the reviewer vector, and the customer vector representing the customer characteristic as a respective numerical value in the customer vector; and
responsive to the determined match between the customer characteristic and the at least one reviewer characteristic of the one or more reviewers associated with the one or more reviews in the set of reviews associated with the merchant offering, generating a set of recommendations to be presented, via a customer electronic device associated with the first customer profile, the set of recommendations relating to the merchant offering.

12. The method of claim 11, further comprising:
identifying the set of reviews associated with the merchant offering from amongst one or more stored reviews based on quantitative ratings associated with the one or more stored reviews.

13. The method of claim 11, wherein the set of reviews associated with the merchant offering is identified from amongst one or more stored reviews based on keywords associated with each of the one or more stored reviews.

14. The method of claim 13, wherein the one or more stored reviews include a non-textual review having an audio component, the method further comprising:
converting the audio component to a textual component using speech-to-text conversion; and
extracting the keywords associated with the non-textual review from the textual component using text analysis.

15. The method of claim 11, further comprising:
determining a strength of correlation between the at least one reviewer characteristic and the one or more reviews in the set of reviews associated with the merchant offering; and
storing an association between the at least one reviewer characteristic and the merchant offering, the association including an indicator of correlation representing the strength of correlation between the at least one reviewer characteristic and the set of reviews associated with the merchant offering.

16. The method of claim 15, wherein the set of reviews associated with the merchant offering is a set of positive reviews, and wherein the strength of correlation is determined based on a measured occurrence of the at least one reviewer characteristic in the set of positive reviews compared to a measured occurrence of the at least one reviewer characteristic in a set of non-positive reviews for the merchant offering.

17. The method of claim 15, wherein presentation the set of recommendations is ordered based on the indicator of correlation.

18. The method of claim 11, wherein the set of recommendations selectively includes the merchant offering based on whether the one or more of the reviews in the set of reviews associated with the merchant offering are positive reviews or non-positive reviews.

19. The method of claim 11, wherein the set of reviews associated with the merchant offering is a set of positive reviews associated with the merchant offering and wherein the set of recommendations includes the merchant offering.

20. The method of claim 11, wherein reviews of the set of reviews associated with the merchant offering are identified as positive or non-positive reviews using sentiment analysis.

21. A non-transitory computer readable medium having instructions tangibly stored thereon, wherein the instructions, when executed, cause a system to:
identify, based on reviewer profiles of reviewers associated with a set of reviews associated with a merchant offering, at least one reviewer characteristic of one or more reviewers associated with one or more reviews in the set of reviews associated with the merchant offering;
determine a match between a customer characteristic, identified based on a first customer profile, and the at least one reviewer characteristic by correlating a reviewer vector with a customer vector, the reviewer vector representing each of the at least one reviewer characteristic as a respective numerical value in the reviewer vector, and the customer vector representing the customer characteristic as a respective numerical value in the customer vector; and
responsive to the determined match between the customer characteristic and the at least one reviewer characteristic of the one or more reviewers associated with the one or more reviews in the set of reviews associated with the merchant offering, generate a set of recommendations to be presented, via a customer electronic device associated with the first customer profile, the set of recommendations relating to the merchant offering.

* * * * *